United States Patent [19]

Braun et al.

[11] Patent Number: 5,475,076

[45] Date of Patent: * Dec. 12, 1995

[54] ORGANO(POLY)SILOXANE COMPOSITIONS WHICH CAN BE CROSS-LINKED TO GIVE ELASTOMERS WITH ELIMINATION OF ALCOHOLS

[75] Inventors: Rudolf Braun, Kastl; Petra Absmaier, Emmerting, both of Germany

[73] Assignee: Wacker-Chemie GmbH, Munich, Germany

[*] Notice: The portion of the term of this patent subsequent to Apr. 19, 2011, has been disclaimed.

[21] Appl. No.: 150,010

[22] PCT Filed: Jun. 4, 1992

[86] PCT No.: PCT/EP92/01252

§ 371 Date: Jul. 29, 1994

§ 102(e) Date: Jul. 29, 1994

[87] PCT Pub. No.: WO92/21724

PCT Pub. Date: Dec. 10, 1992

[30] Foreign Application Priority Data

Jun. 6, 1991 [DE] Germany ............... 41 18 598.6

[51] Int. Cl.$^6$ .................................................. C08G 77/06
[52] U.S. Cl. ................. 528/14; 528/15; 528/18; 528/21; 528/23; 528/31; 556/487; 556/482; 523/209; 523/212; 524/731; 524/791; 524/789; 524/779; 524/730; 524/860; 524/786; 524/785
[58] Field of Search ..................... 556/487, 482; 528/31, 15, 23, 21, 18, 14; 524/731, 791, 789, 779, 730, 860, 786, 785; 523/209, 212

[56] References Cited

U.S. PATENT DOCUMENTS

| | | |
|---|---|---|
| 3,334,067 | 8/1967 | Weyenberg . |
| 3,423,362 | 1/1969 | Kötzsch . |
| 3,457,352 | 7/1969 | Hafner . |
| 3,576,028 | 4/1971 | Fish . |
| 3,708,467 | 1/1973 | Smith et al. . |
| 4,294,975 | 10/1981 | Takago et al. ............... 556/482 |
| 4,434,283 | 2/1984 | Sattlegger et al. . |
| 4,489,191 | 12/1984 | Chung . |
| 4,942,211 | 7/1990 | Sommer et al. . |
| 5,051,467 | 9/1991 | Okinoshima et al. . |
| 5,166,293 | 11/1992 | Okinoshima et al. ............... 528/31 |
| 5,304,621 | 4/1994 | Staiger et al. ............... 528/31 |

FOREIGN PATENT DOCUMENTS

| | | |
|---|---|---|
| 0022976 | 1/1981 | European Pat. Off. . |
| 1125886 | 7/1956 | France . |
| 1238264 | 7/1960 | France . |
| 3801389 | 7/1989 | Germany . |
| 3939176 | 5/1990 | Germany . |
| 4013281 | 10/1991 | Germany . |
| 1184248 | 3/1970 | United Kingdom . |
| 1183989 | 3/1970 | United Kingdom . |
| 9116371 | 10/1991 | WIPO . |

OTHER PUBLICATIONS

Albert F. Rielly, H. W. Post, J. Org. Chem. 16 (1951) 383.

R. Müller, J. Prakt. Chem. 9 (1959) 63.

R. C. Mehrotra, Indian J. Chem. 5 (1967).

Primary Examiner—Melvyn I. Marquis
Attorney, Agent, or Firm—Martin Connaughton

[57] ABSTRACT

The invention relates to organo(poly)siloxane compositions which have long shelf life in the absence of water, but can be crosslinked in the presence of water, even at room temperature, to give elastomers with elimination of alcohols, and to a process for the preparation of such compositions.

10 Claims, No Drawings

ORGANO(POLY)SILOXANE COMPOSITIONS WHICH CAN BE CROSS-LINKED TO GIVE ELASTOMERS WITH ELIMINATION OF ALCOHOLS

The invention relates to organo(poly)siloxane compositions which have a long shelf life in the absence of water, but can be crosslinked in the presence of water, even at room temperature, to give elastomers with elimination of alcohols, and to a process for the preparation of such compositions.

Organopolysiloxane compositions which can he crosslinked to give elastomers with elimination of alcohols and processes for their preparation are known in large number. Reference may be made here, for example, to U.S. Pat. No. 3,334,067 (Dow Corning Corp.; published on 1 Aug. 1967), in which a process is described for the preparation of room temperature-crosslinkable organopolysiloxane compositions by mixing a hydroxyl-containing organopolysiloxane with an organyl(triorganyloxy)silane and a titanium compound. Furthermore, DE-A 3 801 389 (Wacker-Chemie GmbH; published on 27 Jul. 1989) and the corresponding US application having the serial number U.S. Ser. No. 29 3909 (filed on the 6th Jan. 1989) describe organopolysiloxane compositions which can be crosslinked to give elastomers with elimination of alcohols and have been stabilised by sails from main group or subgroup 2 with branched carboxylic acids. Furthermore, U.S. Pat. No. 3,708,467 (General Electric Co.; published on 2 Jan. 1973) describes a curable composition which is obtained by mixing an organopolysiloxane containing hydroxyl groups in the terminal units with methyltrimethoxysilane and a cocatalyst system.

However, such compositions generally have a very slow crosslinking rate, and metal compounds, such as, for example, tin compounds, must therefore be added as a condensation catalyst in order to accelerate the reaction. However, this frequently impairs the shelf life, so that such compositions only cure very slowly, if at all, after relatively long storage.

DE 39 39 176 A1 describes organosilicon compounds which do not contain an SiC bond and which comprise $H(R^1O)SiO_{2/2}$ and $H(R^1O)_2SiO_{1/2}$ units, where $R^1$ is a hydrocarbon radical.

FR 1125886 describes organopolysiloxanes which contain a hydrogen atom on each silicon atom and alkoxy groups on the terminal silicon atoms.

EP 22 976 describes polysiloxane molding compositions which comprise hydroxy-functional siloxane, crosslinking agent, filler, optionally a curing catalyst and a silicon compound containing at least 3 alkoxy groups, such as, for example, tetraethoxysilane.

The object of the present invention was to provide organo(poly)siloxane compositions which can he crosslinked to give elastomers with elimination of alcohols and can be stored for a long time in the absence of water without any significant change in their desired properties and crosslink in a relatively short time in the presence of water to give elastomers. A further object of the present invention was to provide a process for the preparation of organo(poly)siloxane compositions which can be crosslinked to give elastomers with elimination of alcohols. These objects are achieved by the present invention.

The invention relates to organo(poly)siloxane compositions which can be crosslinked to give elastomers with elimination of alcohols and can be prepared from
(A) α,ω-dihydroxyorgano(poly)siloxane, (B) an organosilicon compound of the general formula

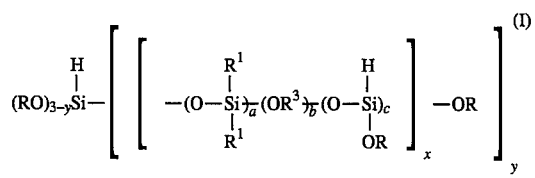

and/or partial hydrolysates thereof and/or partial condensates thereof and/or partial cohydrolysates thereof with (C) and/or partial cocondensates thereof with (C) and/or the products of the reaction of these hydrolysates and condensates with $R^2_3SiOH$ and/or $R^2_3SiOSiR^2_3$, with the proviso that each organosilicon compound molecule contains on average more than two organyloxy radicals RO— or $R^4O$— where R and $R^4$ are monovalent, optionally substituted hydrocarbon radicals, where R may be identical or different and is a monovalent, optionally substituted hydrocarbon radical or the radical —$SiR^2_3$, $R^1$ may be identical or different and is a hydrogen atom, a monovalent organic radical or an organosiloxy group, $R^2$ may be identical or different and is a hydrogen atom or a monovalent organic radical, $R^3$ may be identical or different and is a divalent, optionally substituted organic radical, a may in each case be identical or different and is 0 or an integer between 1 and 1,000, b may in each case be identical or different and is 0 or an integer between 1 and 100, c may in each case be identical or different and is 0 or an integer between 1 and 100, x may in each case be identical or different and is 0 or an integer between 1 and 100, and y may be 1, 2 or 3, and optionally (C) an organosilicon compound of the general formula

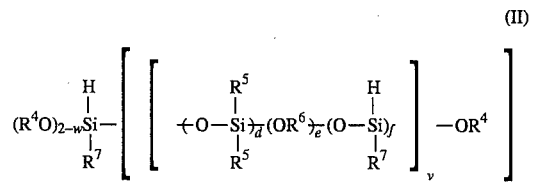

and/or partial hydrolysates thereof and/or partial condensates thereof and/or the products of the reaction of these hydrolysates and condensates with $R^2_3SiOH$ and/or $R^2_3SiOSiR^2_3$, with the proviso that each organosilicon compound molecule contains on average more than one organyloxy radical $R^4O$— where $R^4$ is a monovalent, optionally substituted hydrocarbon radical, in which $R^4$ may be identical or different and is a monovalent, optionally substituted hydrocarbon radical or the radical —$SiR^2_3$, where $R^2$ may be identical or different and is a hydrogen atom or a monovalent organic radical, $R^5$ may be identical or different and is a hydrogen atom, a monovalent organic radical or an organosiloxy group, $R^6$ may be identical or different and is a divalent, optionally substituted organic radical, $R^7$ is a monovalent, SiC-bonded, optionally substituted hydrocarbon radical having 1 to 18 carbon atom(s), d may in each case be identical or different and is 0 or an integer between 1 and 1,000, e may in each case be identical or different and is 0 or an integer between 1 and 100, f may in each case be identical or different and is 0 or an integer between 1 and 100, v may in each case be identical or different and is 0 or an integer between 1 and 100, and w may be 1 or 2, with the proviso that, in the case where x=0 and/or a=b=c=0, at least one further substance selected from the group comprising fillers, plasticisers and adhesion promoters is also used.

For purposes of the present invention further use of formulas I and II shall be understood to include partial hydrolysates and partial condensates thereof as well as the corresponding cohydrolysates and cocondensates of (B) and (C) and these hydrolysates and condensates with $R^2_3SiOH$ and/or $R^2_3SiOSiR^2_3$.

In the organo(poly)siloxane compositions according to the invention, component (A) is preferably an α,ω-dihydroxydiorgano(poly)siloxane of the general formula

in which $R^8$ is identical or different, monovalent, SiC-bonded organic radicals, and n is a number of at least 20, preferably between 100 and 2000, particularly preferably between 500 and 1500, in particular between 600 and 1400.

Although not shown by the formula (III), it is possible for up to 10 mol percent of the diorganosiloxane units to be replaced by other siloxane units, such as, for example, $R^8SiO_{3/2}$ and/or $SiO_{4/2}$ units, where $R^8$ is as defined above. In addition, the organo(poly)siloxanes of the formula (III)—although again not shown in the formula (III)—may contain, as a result of the preparation, up to 10 mol percent of other functional groups, such as, for example, $HR^8SiO$ and $HSiO_{3/2}$ groups.

The radical $R^8$ is preferably optionally substituted hydrocarbon radicals having 1 to 18 carbon atom(s).

Examples of radicals $R^8$ are alkyl radicals, such as the methyl, ethyl, n-propyl, isopropyl, n-butyl, isobutyl, tert.-butyl, n-pentyl, isopentyl, neopentyl and tert.-pentyl radicals, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and allyl radicals; cycloalkyl radicals, such as cyclopentyl, cyclohexyl, cycloheptyl and methylcyclohexyl radicals; aryl radicals, such as phenyl, naphthyl, anthryl and phenanthryl radicals; alkaryl radicals, such as o-, m- and p-tolyl radicals, xylyl radicals and ethylphenyl radicals, and aralkyl radicals, such as the benzyl radical and the alpha- and β-phenylethyl radicals.

Further examples of radicals $R^8$ are linear or branched or cyclic hydrocarbon radicals which are substituted by acryloxy, methacryloxy, epoxy, allyl, cyclohexenyl and/or cyano groups and/or by halogen atoms.

Examples of substituted radicals $R^8$ are cyanoalkyl radicals, such as the β-cyanoethyl radical, and halogenated hydrocarbon radicals, for example haloalkyl radicals, such as the 3,3,3-trifluoro-n-propyl radical, the 2,2,2,2',2',2'- hexafluoroisopropyl radical and the heptafluoroisopropyl radical, and haloaryl radicals, such as the o-, m- and p-chlorophenyl radicals.

Particularly preferred radicals $R^8$ are methyl, ethyl and n-propyl radicals, in particular the methyl radical.

If only due to the ready accessibility, at least 90% of the radicals $R^8$ in the formula (III) are preferably methyl radicals.

The α,ω-dihydroxydiorgano(poly)siloxane employed according to the invention may be identical or different homopolymers or copolymers, it being possible for the individual molecules to have identical or different chain lengths.

The α,ω-dihydroxyorgano(poly)siloxanes employed according to the invention preferably have a viscosity of from 1,000 to 400,000 mPa.s, particularly preferably from 20,000 to 350,000 mPa.s, at 25° C.

Examples of α,ω-dihydroxyorgano(poly)siloxanes of the formula (III) employed according to the invention are α,ω-dihydroxydimethyl(poly)siloxanes, α,ω-dihydroxydimethyl/methylvinylco(poly)siloxanes, α,ω-dihydroxydimethyl/methylphenylco(poly)siloxanes and α,ω-dihydroxydimethyl/methyl-3,3,3-trifluoro-n-propylco(poly)siloxanes.

The preparation of the α,ω-dihydroxyorgano(poly)siloxanes employed in the compositions according to the invention is well known. Reference may be made here, for example, to W. Noll, "Chemistry and Technology of Silicones", 1968, Academic Press Inc., page 218 ff.

The radicals R and $R^4$ are each, independently of one another, preferably hydrocarbon radicals which have 1 to 10 carbon atom(s) and may be substituted by alkoxy groups having 1 to 3 carbon atom(s) and other non-alkaline, organic radicals, or are the radical —$SiR^2_3$ where $R^2$ is as defined above.

Examples of radicals R and $R^4$ are the examples of hydrocarbon radicals having 1 to 10 carbon atom(s) given above for the radical $R^8$, —$Si(CH_3)_3$, —$CH_2CH_2OCH_3$,

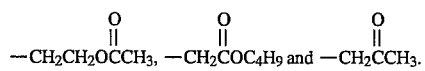

The hydrocarbon radicals R and $R^4$ are each, independently of one another, particularly preferably methyl, ethyl and n-propyl radicals, in particular the ethyl radical.

If the radicals R and $R^4$ are a radical —$SiR^2_3$ where $R^2$ is as defined above, —$Si(CH_3)_3$ is particularly preferred.

The radicals $R^1$ and $R^5$ are each, independently of one another, preferably hydrogen atoms or optionally substituted hydrocarbon radicals having 1 to 18 carbon atom(s).

However, $R^1$ and $R^5$ may also—but usually only to a low percentage—be organosiloxy radicals. The organosiloxy radicals may be any organosilicon compounds, such as linear or branched organo(poly)siloxanes or silanes, which are bonded by a silicon atom via oxygen to the silicon atom of the

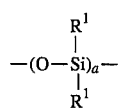

group in the formula (I) or the

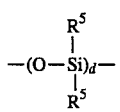

group in the formula (II).

The radical $R^2$ is preferably a hydrogen atom or an optionally substituted hydrocarbon radical having 1 to 18 carbon atom(s), it being preferred for not more one radical $R^2$ in the $SiR^2{}_3$ unit to be a hydrogen atom.

Examples of radicals $R^1$, $R^2$ and $R^5$ are the examples indicated for the radical $R^8$.

The radicals $R^1$ and $R^5$ are each, independently of one another, particularly preferably hydrogen atoms, or methyl, ethyl, propyl or vinyl radicals.

The radical $R^2$ is particularly preferably a hydrogen atom or a methyl, ethyl or vinyl radical.

Examples of the radical $R^7$ are the examples indicated for the radical $R^8$.

The radical $R^7$ is particularly preferably a methyl, ethyl, n-propyl or 3,3,3-trifluoro-n-propyl radical, in particular the methyl radical.

The radicals $R^3$ and $R^6$ are each, independently of one another, preferably divalent linear radicals of the formula —$(C_qH_{2q-o}R'_o)$— in which R' is a non-alkaline organic radical, such as, for example, an optionally substituted alkyl or aryl radical, HO—, R"O—, R"—COO— or R"—CO— where R" is an organic radical, q is a number from 2 to 20, and o is 0 or a number from 1 to 10, divalent cyclic radicals of the formula —$(C_jH_{2j-2-l}R'_l)$— in which R' has one of the abovementioned meanings, j is a number from 3 to 8, and l is 0 or a number from 1 to 8, or divalent aromatic radicals having 6 to 20 carbon atoms which are optionally substituted by R'.

Examples of radicals $R^3$ and $R^6$ are methylene, ethylene, n-propylene, isopropylene, 1-n-butylene, 2-n-butylene, isobutylene, tert.-butylene, n-pentylene, isopentylene, neopentylene and tert.-pentylene radicals, hexylene radicals, such as the n-hexylene radical, heptylene radicals, such as the n-heptylene radical, octylene radicals, such as the n-octylene radical, and isooctylene radicals, such as the 2,2,4-trimethylpentylene radical, nonylene radicals, such as the n-nonylene radical, and decylene radicals, such as the n-decylene radical, and cycloalkylene radicals, such as cyclopentylene, cyclohexylene, cycloheptylene and methylcyclohexylene radicals, cyanoalkylene radicals, such as the β-cyanoethylene radical, and halogenated hydrocarbon radicals, for example haloalkylene radicals, such as the 3,3,3-trifluoro-n-propylene radical and the 2,2,2,2',2',2'-hexafluoroisopropylene radical, and haloarylene radicals, such as the o-, m- and p-chlorophenylene radicals, and optionally substituted m- and p-propoxyphenylene radicals, 1,4-phenylene, 1,3-phenylene, 4,4'-biphenylene, 3,3'-biphenylene, 3,4'-biphenylene, 1,4-naphthalenediyl, 1,5-naphthalenediyl, 1,4-anthraquinonediyl, 1,5-anthraquinonediyl, 2,6-anthraquinonediyl, diphenylmethane-4,4'-diyl, 2,2-bisphenylpropane-4,4'-diyl, 2,2-bisphenylperfluoropropane-4,4'-diyl, 3,3-bisphenylphthalide-4,4'-diyl and bisphenylsulphone-4,4'-diyl radicals, 2-methyl-1,4-phenylene, 2-chloro-1,4-phenylene, 2-phenyl-1,4-phenylene, 2-cyano-1,4-phenylene, 2,2'-dimethyl-4,4'-biphenylene and 3,3'-dimethyl-4,4'-biphenylene radicals.

The radicals $R^3$ and $R^6$ are each, independently of one another, particularly preferably divalent linear radicals —$(CH_2)_{2-8}$—, in particular —$(CH_2)_6$—.

In the organo(poly)siloxane compositions according to the invention, component (B) is preferably selected from the group comprising $(RO)_3$—Si—H  (IV)

and/or partial hydrolysates thereof and/or partial condensates thereof and/or partial cohydrolysates thereof with (C) and/or partial cocondensates thereof with (C) and/or the products of the reaction of these hydrolysates and condensates with $R^2{}_3SiOH$ and/or $R^2{}_3SiOSiR^2{}_3$, where R and $R^2$ are as defined above, with the proviso that each organosilicon compound molecule contains on average more than two organyloxy radicals RO— or $R^4O$— where R and $R^4$ are monovalent, optionally substituted hydrocarbon radicals,

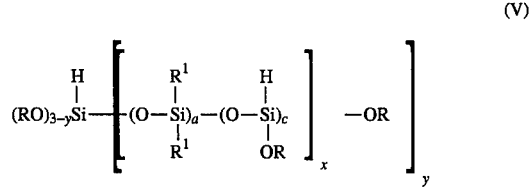

(V)

and/or partial hydrolysates thereof and/or partial condensates thereof and/or partial cohydrolysates thereof with (C) and/or partial cocondensates thereof with (C) and/or the products of the reaction of these hydrolysates and condensates with $R^2{}_3SiOH$ and/or $R^2{}_3SiOSiR^2{}_3$, where R, $R^1$, $R^2$, a, c, x and y are each as defined above, with the proviso that each organosilicon compound molecule contains on average more than two organyloxy radicals RO— or $R^4O$— where R and $R^4$ are monovalent, optionally substituted hydrocarbon radicals, and x is not 0, and a and c are each on average not 0,

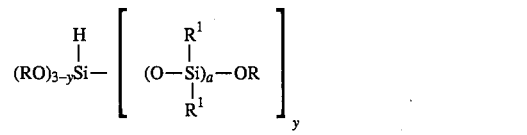

(VI)

and/or the corresponding partial hydrolysates and/or partial condensates and/or partial cohydrolysates thereof with (C) and/or partial cocondensates thereof with (C) and/or the products of the reaction of these hydrolysates and condensates with $R^2{}_3SiOH$ and/or $R^2{}_3SiOSiR^2{}_3$, where R, $R^1$, $R^2$, a and y are each as defined above, with the proviso that each organosilicon compound molecule contains on average more than two organyloxy radicals RO— or $R^4O$— where R and $R^4$ are monovalent, optionally substituted hydrocarbon radicals, and a is not 0 and from 0 to 50 percent of the radicals $R^1$ are hydrogen atoms,

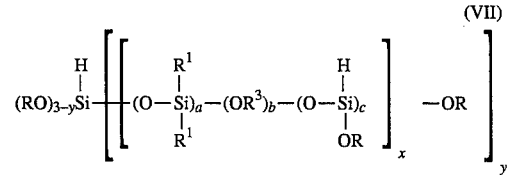

(VII)

and/or the corresponding partial hydrolysates and/or partial condensates and/or partial cohydrolysates thereof with (C) and/or partial cocondensates thereof with (C) and/or the products of the reaction of these hydrolysates and condensates with $R^2{}_3SiOH$ and/or $R^2{}_3SiOSiR^2{}_3$, where R, $R^1$, $R^2$, $R^3$, a, b, c, x and y are each as defined above, with the proviso that each organosilicon compound molecule contains on average more than two organyloxy radicals RO— or R⁴O— where R and R⁴ are monovalent, optionally substituted hydrocarbon radicals, and x is not 0 and b is on average greater than 0, and mixtures thereof.

For purposes of the present invention preferred embodiments of (B) represented by formulas IV, V, Va, VI, VIa VII and VIIa shall be understood to include partial hydrolysates and partial condensates thereof as well as the corresponding cohydrolysates and cocondensates of (B) and (C) and these hydrolysates and condensates with $R^2_3SiOH$ and/or $R^2_3SiOSiR^2_3$.

Examples of silanes of the formula (IV) employed according to the invention as component (B) are hydrotriethoxysilane, hydrotrimethoxysilane, hydrotri(n-propoxy)silane, hydrodimethoxyethoxysilane, hydromethoxydiethoxysilane, hydrotri(2-methoxyethoxy)silane and hydrotri(isopropenoxy)silane, preference being given to hydrotriethoxysilane.

The partial hydrolysates and partial condensates, employed according to the invention, of silanes of the formula (IV) and products of the reaction thereof with $R^2_3SiOH$ and/or $R^2_3SiOSiR^2_3$ where $R^2$ is as defined above preferably comprise $(RO)_2HSiO_{1/2}$, $(RO)HSiO$ and $HSiO_{3/2}$ units where R is as defined above for R, with the proviso that on average more than two radicals R in each molecule are monovalent, optionally substituted hydrocarbon radicals, such as, for example, the hydrolysate of a mixture of hydrotriethoxysilane and diethoxy(trimethylsiloxy)hydrosilane.

The partial cohydrolysates and partial cocondensates with (C) are preferably those of a silane of the formula (IV) and a silane of the formula $$\begin{matrix} & R^7 & \\ & | & \\ (R^4O)_2- & Si & -H \end{matrix} \quad \text{(VIII)}$$

where the partial cohydrolysates and partial cocondensates and products of the reaction thereof contain $(RO)_2HSiO_{1/2}$, $(RO)HSiO$, $HSiO_{3/2}$, $(R^4O)R^7HSiO_{1/2}$ and $R^7HSiO$ units, where R, $R^4$ and $R^7$ are as defined above, with the proviso that on average more than two radicals R or $R^4$ in each molecule are monovalent, optionally substituted hydrocarbon radicals.

The partial (co)hydrolysates and partial (co)condensates and products of the reaction thereof are particularly preferably those which are liquid and/or are soluble in siloxanes.

From 0 to 80 percent, particularly preferably from 0 to 50 percent, of the radicals R and $R^4$ in the partial (co)hydrolysates and partial (co)condensates and products of the reaction thereof are preferably —$SiR^2_3$, where $R^2$ is as defined above.

The partial (co)hydrolysates and partial (co)condensates and products of the reaction thereof preferably have a molecular weight of between 198 and 10,000, particularly preferably between 274 and 1,500, and preferably contain from 2 to 100, particularly preferably from 3 to 15, siloxane units.

Examples of partial hydrolysates and partial condensates of silanes of the formula (IV) and products of the reaction thereof are compounds of the average composition $[(RO)_2HSiO_{1/2}-]_h\ [(RO)HSiO-]_i\ [HSiO_{3/2}-]_k$ in which R may be identical or different and is as defined above, h is on average from 0.02 to 1, i is on average from 0 to 0.98 and k is on average from 0 to 0.5, with the proviso that the sum of h, i and k is 1, and on average each molecule contains more than two groups —OR where R is a monovalent, optionally substituted hydrocarbon radical, particular preference being given to partial hydrolysates and partial condensates of hydrotriethoxysilane and products of the reaction thereof with trimethylsilanol and/or hexamethyldisiloxane which contain on average more than two ethoxy groups.

Examples of partial cohydrolysates and partial cocondensates of silanes of the formula (IV) with silanes of the formula (VIII) and products of the reaction thereof are compounds of the average composition $[(RO)_2HSiO_{1/2}-]_h\ [(RO)HSiO-]_i\ [HSiO_{3/2}-]_k$ $[(R^4O)R^7SHiO_{1/2}-]_{k1}\ [R^7HSiO]_{k2}$ in which R, $R^4$ and $R^7$ are as defined above, h is from 0.02 to 0.95, i is from 0 to 0.98, k is from 0 to 0.5, k1 is from 0 to 0.95 and k2 is from 0 to 0.95, with the proviso that the sum of h, i, k, k1 and k2 is 1, and on average each molecule contains more than two groups —OR or —$OR^4$ where R and $R^4$ are monovalent, optionally substituted hydrocarbon radicals, particular preference being given to partial cohydrolysates and partial cocondensates of hydrotriethoxysilane and hydromethyldiethoxysilane and products of the reaction thereof with trimethylsilanol and/or hexamethyldisiloxane which contain on average more than two ethoxy groups.

The present invention furthermore relates to organosilicon compounds comprising units selected from the group comprising $(RO)_2HSiO_{1/2}$, $(RO)HSiO$, $HSiO_{3/2}$, $(R^4O)R^7HSiO_{1/2}$ and $R^7HSiO$ units, where R and $R^4$ may each, independently of one another, be identical or different and are monovalent, optionally substituted hydrocarbon radicals or the radical —$SiR^2_3$, where $R^2$ may be identical or different and is a hydrogen atom or a monovalent organic radical, and $R^7$ is a monovalent organic radical, with the proviso that each organosilicon compound molecule contains in total at least one radical, preferably at least two radicals, —OR or —$OR^4$ where R and $R^4$ are monovalent, optionally substituted hydrocarbon radicals, and in total at least one radical —OR or —$OR^4$ where R and $R^4$ are —$SiR^2_3$ where $R^2$ may be identical or different and are hydrogen atoms or monovalent organic radicals.

The siloxanes of the formula (V) employed as component (B) are preferably low-molecular-weight organo(poly)siloxanes having terminal siloxane units containing organyloxy and hydrogen groups.

Examples of the siloxanes of the formula (V) according to the invention are α,ω-bis(hydrodimethoxysiloxy)dimethyl(poly)siloxanes, α,ω-bis(hydrodiethoxysiloxy)dimethyl(poly)siloxanes, α,ω-bis(hydrodiethoxysiloxy)dimethyl/methylvinyl-co(poly)siloxanes, α,ω-bis(hydrodimethoxysiloxy)hydromethyl(poly)siloxanes, α,ω-bis(hydrodiethoxysiloxy)dimethyl/hydromethylco(poly)siloxanes, α,ω-bis(hydrodiethoxysiloxy)ethoxyhydro/hydromethylco(poly)siloxanes, α,ω-bis(hydrodiethoxysiloxy)ethoxyhydro/dimethylco(poly)siloxanes, α-(hydrodiethoxysiloxy)-ω-(hydroethoxymethylsiloxy)dimethyl(poly)siloxanes and all the compounds of said type in which all or some of the ethoxy groups have been replaced by other alkoxy groups, such as, for example, by methoxy or n-propoxy radicals, or trimethylsiloxy groups, with the proviso that each molecule contains more than two alkoxy groups.

The organo(poly)siloxanes of the formula (v) are particularly preferably those of the formula

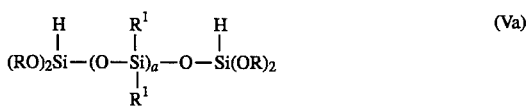 (Va)

and/or the corresponding partial hydrolysates and/or partial condensates and/or products of the reaction thereof with $R^2_3SiOH$ or $R^2_3SiOR^2_3$, in which R, $R^1$ and $R^2$ may each be identical or different and are as defined above, and a is an integer between 0 and 1000, in particular between 0 and 100, with the proviso that more than two of the radicals R in each molecule are monovalent, optionally substituted hydrocarbon radicals.

Examples of particularly preferably employed organo(p-oly)siloxanes of the formula (V) are α,ω-bis(hydrodiethoxysiloxy)dimethyl(poly)siloxanes and α-(hydrodiethoxysiloxy)-ω-(hydro(trimethylsiloxy)ethoxysiloxy)dimethyl(poly)siloxanes.

The organo(poly)siloxanes of the formula (V) employed according to the invention preferably have a viscosity of from 1 to 100,000 mPa.s, particularly preferably from 5 to 500 mPa.s, at a temperature of 23° C.

Examples of organo(poly)siloxanes of the formula (VI) employed according to the invention as component (B) are $(C_2H_5O)_2HSi(OSi(CH_3)_2)_uOC_2H_5$, $(C_2H_5O)_2HSi(OSiHCH_3)_uOC_2H_5$, $(C_2H_5O)HSi[(OSiHCH_3)_uOC_2H_5]_2$ and $HSi[(OSiHCH_3)_uOC_2H_5]_3$, where u is a number from 1 to 20, mixtures thereof and all compounds of said type in which all or some of the ethoxy groups have been replaced by other alkoxy groups, such as, for example, by methoxy or n-propoxy radicals, or by trimethylsiloxy groups, with the proviso that each molecule contains on average more than two alkoxy groups.

Preferably from 0 to 50 percent, in particular from 40 to 50 percent, of the radicals $R^1$ are hydrogen atoms, where no silicon atom should have more than one Si-bonded hydrogen atom.

The organo(poly)siloxanes of the formula (VI) employed according to the invention preferably have from 2 to 100, in particular from 4 to 20, siloxane units and preferably have a viscosity of from 2 to 2,000 mPa.s, particularly preferably from 4 to 100 mPa.s, at a temperature of 23° C.

The organo(poly)siloxanes of the formula (VI) are preferably $(C_2H_5O)_2HSi(OSi(CH_3)_2)_uOC_2H_5$, $(C_2H_5O)_2HSi(OSiHCH_3)_uOC_2H_5$, $(C_2H_5O)HSi[(OSiHCH_3)_uOC_2H_5]_2$ and $HSi[(OSiHCH_3)_uOC_2H_5]_3$, where u is a number from 1 to 10, mixtures thereof and products of the reaction thereof with trimethylsilanol and/or hexamethyldisiloxane, with the proviso that each molecule contains more than two ethoxy groups, particular preference being given, as a consequence of the preparation, to mixtures of the abovementioned compounds and products of the reaction thereof.

The present invention furthermore relates to organosilicon compounds of the formula

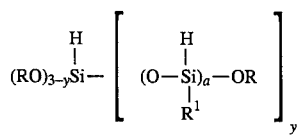 (VIa)

and/or the corresponding partial hydrolysates and/or partial condensates and/or partial cohydrolysates thereof with (C) and/or partial cocondensates thereof with (C) and/or the products of the reaction of these hydrolysates and condensates with $R^2_3SiOH$ and/or $R^2_3SiOSiR^2_3$, where a may in each case be identical or different and is an integer between 1 and 1,000, y may be 1, 2 or 3, R may be identical or different and is a monovalent, optionally substituted hydrocarbon radical or the radical —$SiR^2_3$, $R^1$ may be identical or different and is a monovalent organic radical or an organosiloxy group, and $R^2$ may be identical or different and is a hydrogen atom or a monovalent organic radical, with the proviso that each organosilicon compound molecule contains on average more than two organyloxy radicals RO— or $R^4O$— where R and $R^4$ are monovalent, optionally substituted hydrocarbon radicals.

In the formula (VII), a is an integer, preferably between 0 and 100, particularly preferably between 0 and 50, b is an integer, preferably between 0 and 50, particularly preferably between 0 and 20, and c is an integer, preferably between 0 and 50, particularly preferably between 0 and 20.

Examples of organo(poly)siloxanes of the formula (VII) employed according to the invention as component (B) are

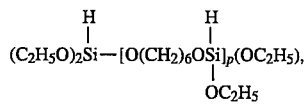

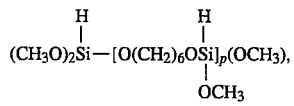

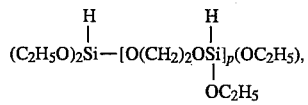

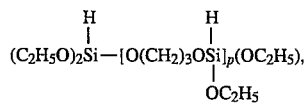

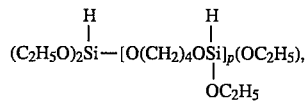

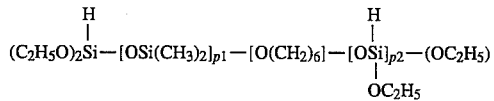

and products of the reaction thereof with $R^2_3SiOH$ or $R^2_3SiOR^2_3$, where $R^2$ is as defined above, p is a number from 1 to 50, p1 is a number from 1 to 1,000 and p2 is a number from 1 to 20, with the proviso that each molecule contains on average more than two alkoxy groups.

The organo(poly)siloxanes of the formula (VII) employed according to the invention preferably have 2 to 100, in particular 2 to 50, siloxane units and preferably have a viscosity of from 1 to 20,000 mPa.s, particularly preferably from 1 to 1,000 mPa.s.

The organo (poly) siloxanes of the formula (VII) are preferably

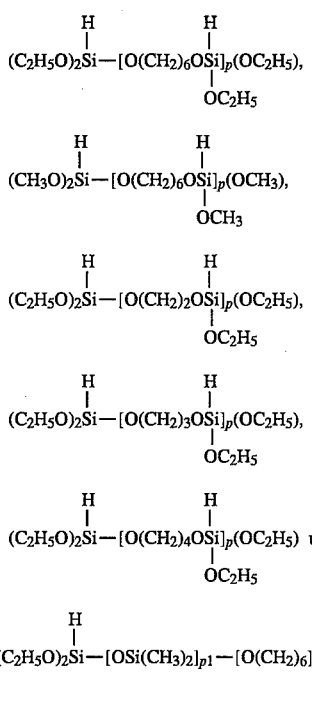

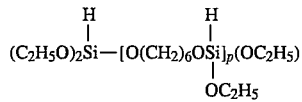

where p is a number from 1 to 20, p1 is a number from 1 to 100 and p2 is a number from 1 to 10 and products of the reaction thereof with trimethylsilanol or hexamethyl-disiloxane, with the proviso that each molecule contains more than two alkoxy groups, particular preference being given to

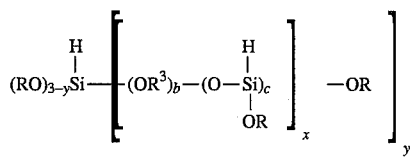

The present invention furthermore relates to organosilicon compounds of the formula

(VIIa)

and/or the corresponding partial hydrolysates and/or partial condensates and/or partial cohydrolysates thereof with (C) and/or partial cocondensates thereof with (C) and/or the products of the reaction of these hydrolysates and condensates with $R^2_3SiOH$ and/or $R^2_3SiOSiR^2_3$,
where R may be identical or different and is a monovalent, optionally substituted hydrocarbon radical or the radical $-SiR^2_3$, $R^2$ may be identical or different and is a hydrogen atom or a monovalent organic radical, $R^3$ may be identical or different and is a divalent, optionally substituted organic radical, b may in each case be identical or different and is 0 or an integer between 1 and 100, c may in each case be identical or different and is 0 or an integer between 1 and 100, x may in each case be identical or different and is an integer between 1 and 100, and y may be 1, 2 or 3, with the proviso that each organosilicon compound molecule contains on average more than two organyloxy radicals RO— or $R^4O$— where R and $R^4$ are monovalent, optionally substituted hydrocarbon radicals, and both b and c are on average greater than 0.

Component (C) optionally added in the organo(poly)siloxane compositions according to the invention is preferably selected from the group comprising $$\begin{array}{c} R^7 \\ | \\ (R^4O)_2-Si-H \end{array}$$
(VIII)

and/or partial hydrolysates thereof and/or partial condensates thereof and/or the products of the reaction of these hydrolysates and condensates with $R^2_3SiOH$ and/or $R^2_3SiOSiR^2_3$, where $R^2$, $R^4$ and $R^7$ are as defined above, with the proviso that each organosilicon compound molecule contains on average more than one organyloxy radical $R^4O$— where $R^4$ is a monovalent, optionally substituted hydrocarbon radical,

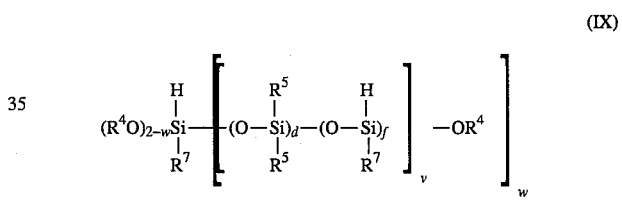
(IX)

and/or the corresponding partial hydrolysates and/or partial condensates and/or the products of the reaction of these hydrolysates and condensates with $R^2_3SiOH$ and/or $R^2_3SiOSiR^2_3$, where $R^2$, $R^4$, $R^5$, $R^7$, d, f, v and w are as defined above, with the proviso that each organosilicon compound molecule contains on average more than one organyloxy radical $R^4O$— where $R^4$ is a monovalent, optionally substituted hydrocarbon radical, and v is not 0 and d and f are each on average not 0,

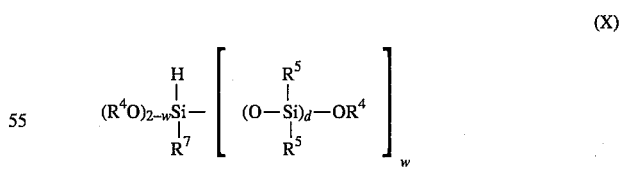
(X)

and/or the corresponding partial hydrolysates and/or partial condensates and/or the products of the reaction of these hydrolysates and condensates with $R^2_3SiOH$ and/or $R^2_3SiOSiR^2_3$, where $R^2$, $R^4$, $R^5$, $R^7$, d and w are as defined above, with the proviso that each organosilicon compound molecule contains on average more than one organyloxy radical $R^4O$— where $R^4$ is a monovalent, optionally substituted hydrocarbon radical, and d is not 0 and from 0 to 50 percent of the radicals $R^5$ are hydrogen atoms,

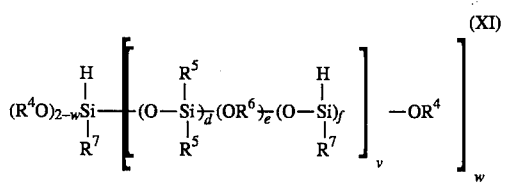

(XI)

and/or the corresponding partial hydrolysates and/or partial condensates and/or the products of the reaction of these hydrolysates and condensates with $R^2_3SiOH$ and/or $R^2_3SiOSiR^2_3$, where $R^2$, $R^4$, $R^5$, $R^6$, $R^7$, d, e, f, v and w are as defined above, with the proviso that each organosilicon compound molecule contains on average more than one organyloxy radical $R^4O$— where $R^4$ is a monovalent, optionally substituted hydrocarbon radical, and v is not 0 and e is on average greater than 0, and mixtures thereof.

For purposes of the present invention preferred embodiments of (C) represented by formulas VIII, IX, IXa, X, Xa, XI and XIa shall be understood to include partial hydrolysates and partial condensates thereof and products of these hydrolysates and condensates with $R^2_3SiOH$ and/or $R^2_3SiOSiR^2_3$.

Examples of silanes of the formula (VIII) employed according to the invention as component (C) are hydromethyldiethoxysilane, hydromethyldimethoxysilane, hydromethyldi(n-propoxy)silane, hydromethylmethoxyethoxysilane, hydromethyldi(2-methoxyethoxy)silane and hydromethyldi(isopropenoxy)silane, preference being given to hydromethyldiethoxysilane.

The partial hydrolysates and partial condensates, employed according to the invention, of silanes of the formula (VIII) and products of the reaction thereof with $R^2_3SiOH$ and/or $R^2_3SiOSiR^2_3$, where $R^2$ is as defined above preferably comprise $(R^4O)HR^7SiO_{1/2}$ and $R^7HSiO$ units where $R^4$ and $R^7$ are as defined above for $R^4$ and $R^7$ respectively, with the proviso that on average more than one radical $R^4$ per molecule is an optionally substituted hydrocarbon radical.

The partial hydrolysates preferably have a molecular weight of between 162 and 7,000, particularly preferably between 250 and 3,000, and preferably contain from 2 to 100, particularly preferably from 3 to 50, siloxane units.

Silanes of the formula (VIII) and partial hydrolysates thereof are widely known, like silanes of the formula (IV) and partial hydrolysates thereof. Reference may be made here, for example, to A. F. Rielly, H. W. Post, J. Org. Chem. 16 (1951) 383.

Examples of partial hydrolysates of silanes of the formula (VIII) are α,ω-bis(hydromethoxymethylsiloxy)hydromethyl(poly)siloxanes and α,ω-bis(hydroethoxymethylsiloxy)hydromethyl(poly)siloxanes, particular preference being given to α,ω-bis(hydroethoxymethylsiloxy)hydromethyl(poly)siloxanes containing from 3 to 50 siloxane units.

The siloxanes of the formula (IX) employed as component (C) are preferably low-molecular-weight organo(poly)siloxanes having terminal siloxane units containing organyloxy and hydrogen groups.

Examples of the siloxanes of the formula (IX) according to the invention are α,ω-bis(hydromethoxymethylsiloxy)dimethyl(poly)siloxanes, α,ω-bis(hydroethoxymethylsiloxy)dimethyl(poly)siloxanes, α,ω-bis(hydroethoxymethylsiloxy)hydromethyl(poly)siloxanes and α,ω-bis(hydroethoxymethylsiloxy)hydromethyl/dimethylco(poly)siloxanes.

The organo(poly)siloxanes of the formula (IX) are particularly preferably those of the formula

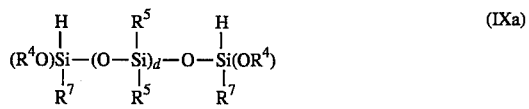

(IXa)

and/or the corresponding partial hydrolysates and/or partial condensates and/or products of the reaction thereof with $R^2_3SiOH$ or $R^2_3SiOR^2_3$, in which $R^4$, $R^5$ and $R^7$ may each be identical or different and are as defined above, and d is an integer between 0 and 1,000, in particular between 1 and 100, with the proviso that more than one radical $R^4$ per molecule is a monovalent, optionally substituted hydrocarbon radical.

Examples of particularly preferably employed organo(poly)siloxanes of the formula (IX) are α,ω-bis(hydroethoxymethylsiloxy)dimethyl(poly)siloxanes and α,ω-bis(hydroethoxymethylsiloxy)hydromethyl/dimethylco(poly)siloxanes.

The organo(poly)siloxanes of the formula (IX) employed according to the invention preferably have a viscosity of from 1 to 100,000 mPa.s, particularly preferably from 1 to 100 mPa.s, at a temperature of 23° C.

Organo(poly)siloxanes having terminal siloxane units containing organyloxy and hydrogen groups and processes for their preparation have already been disclosed in the German application with the file reference P 40 13 281.1 (G. Staiger, Wacker-Chemie GmbH; filed on the 26th Apr. 1990). The organo(poly)siloxanes of the formula (V) and of the formula (IX) can be prepared by reacting organo(poly)siloxanes containing two hydroxyl groups with a silane selected from the group comprising a silane of the formula (IV), a silane of the formula (VIII) and mixtures thereof, in the presence of a condensation catalyst, such as, for example, carboxylic acids.

This reaction is preferably carried out at a pressure of from 900 to 1100 hPa and at a temperature of from 23° to 220° C., particularly preferably from 100° to 180° C., but can also be carried out at higher or lower pressures.

Examples of organo(poly)siloxanes of the formula (X) employed according to the invention as component (C) are $(C_2H_5O)HCH_3Si(OSi(CH_3)_2)_{u'}OC_2H_5$, $HCH_3Si[(OSi(CH_3)_2)_{u'}OC_2H_5]_2$, $HCH_3Si[(OSiHCH_3)_{u'}OC_2H_5]_2$ and $(C_2H_5O)HCH_3Si(OSiHCH_3)_{u'}OC_2H_5$, where u' is a number from 1 to 1,000, mixtures thereof and all the compounds of said type in which all or some of the ethoxy groups have been replaced by other alkoxy groups, such as, for example, by methoxy or n-propoxy radicals, or by trimethylsiloxy groups, with the proviso that each molecule contains on average more than one alkoxy group.

Preferably from 0 to 50 percent, in particular from 40 to 50 percent, of the radicals $R^5$ are hydrogen atoms, where no silicon atom should have more than one Si-bonded hydrogen atom.

The present invention furthermore relates to organosilicon compounds of the formula

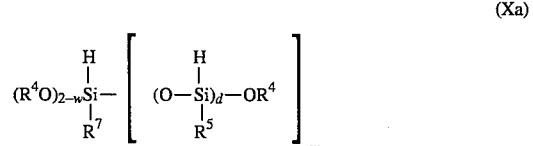

(Xa)

and/or the corresponding partial hydrolysates and/or partial condensates and/or the products of the reaction of these hydrolysates and condensates with $R^2{}_3SiOH$ and/or $R^2{}_3SiOSiR^2{}_3$,
where d may in each case be identical or different and is an integer between 1 and 1,000, w may be 1 or 2, $R^4$ may be identical or different and is a monovalent, optionally substituted hydrocarbon radical or the radical —$SiR^2{}_3$, $R^5$ may be identical or different and is a monovalent organic radical or an organosiloxy group, $R^7$ is a monovalent, SiC-bonded, optionally substituted hydrocarbon radical having 1 to 18 carbon atom(s) and $R^2$ may be identical or different and is a hydrogen atom or a monovalent organic radical, with the proviso that each organosilicon compound molecule contains on average more than one organyloxy radical $R^4O$— where $R^4$ is a monovalent, optionally substituted hydrocarbon radical.

The organo(poly)siloxanes of the formula (X) employed according to the invention, like the organo(poly)siloxanes of the formula (VI), can be prepared, for example, by equilibration of silanes of the formula (VIII) or silanes of the formula (IV) with siloxanes (1) in the absence of water. The organo(poly)siloxanes (1) employed here are preferably those selected from the group comprising linear organo(poly)siloxanes of the formula $$R^9{}_3SiO(SiR^9{}_2O)_rSiR^9{}_3$$

containing terminal triorganosiloxy groups, where $R^9$ may be identical or different and is as defined above for $R^1$, and r is an integer having a value of from 1 to 2,000, the triorganosiloxy end groups remaining in the reaction product, linear organo(poly)siloxanes of the formula $$HO(SiR^{10}{}_2O)_sH$$

containing terminal hydroxyl groups, where $R^{10}$ may be identical or different and is as defined above for $R^1$, and s is an integer having a value of from 3 to 2,000, and cyclic organopolysiloxanes of the formula $$(R^{11}{}_2SiO)_t$$

where $R^{11}$ may be identical or different and is as defined above for $R^1$, and t is an integer from 3 to 12, preferably from 3 to 7.

The equilibration is preferably carried out in the presence of catalysts. Catalysts which can be employed here are all catalysts which it has also been possible to employ hitherto to promote equilibration.

Examples of such catalysts are acidic catalysts, such as, for example, phosphonitrile chloride, trifluoromethanesulphonic acid, acidic clays and sulphuric acid, and basic catalysts, such as, for example, benzyltrimethylammonium hydroxide, alkali metal siloxanolates and alkali metal hydroxides, preference being given to phosphonitrile chloride.

The catalyst is preferably used here in an amount of from 10 to 1,000 ppm (=parts per million) by weight, in particular from 20 to 200 ppm by weight, in each case based on the total weight of the organosilicon compounds employed.

The equilibration is preferably carried out at a temperature of from 0° C. to 200° C. and at a pressure between 900 and 1100 hPa. If desired, however, higher or lower pressures can also be used. Before the mixture obtained on equilibration is worked up, the catalyst is preferably deactivated.

Furthermore, the organo(poly)siloxanes of the formula (X) employed according to the invention as component (C), like the organo(poly)siloxanes of the formula (VI) employed as component (B), can be prepared by cohydrolysis of the corresponding organyloxy- and/or chlorosilanes, optionally in the presence of solvent. In this respect, reference may be made, for example, to R. Müller, J. prakt. Chem. 9 (1959) 63.

The organo(poly)siloxanes of the formula (X) employed according to the invention preferably have from 2 to 100, in particular from 4 to 50, siloxane units and preferably have a viscosity of from 2 to 500 mPa.s, particularly preferably from 3 to 50 mPa.s.

The organo(poly)siloxanes of the formula (X) are preferably $(C_2H_5O)HCH_3Si[OSi(CH_3)_2)]_{1\ to\ 49}(OC_2H_5)$.

In the formula (XI), d is an integer, preferably between 0 and 100, particularly preferably between 0 and 50, e is an integer, preferably between 0 and 50, particularly preferably between 0 and 10, and f is an integer, preferably between 0 and 50, particularly preferably between 0 and 20.

Examples of organo(poly)siloxanes of the formula (XI) employed according to the invention as component (C) are

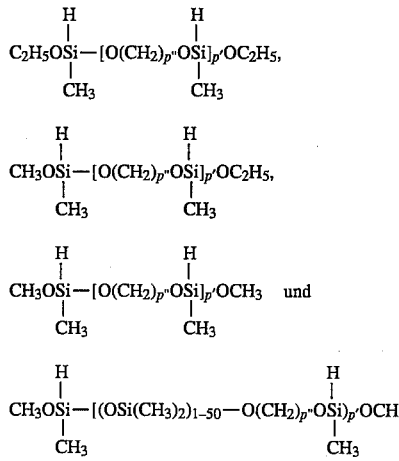

products of the reaction thereof with $R^2{}_3SiOH$ or $R^2{}_3SiOR^2{}_3$, where $R^2$ is as defined above, p' is an integer from 1 to 20 and p" is an integer between 2 and 8, with the proviso that each molecule contains on average more than one alkoxy group.

The preparation of the organo(poly)siloxanes of the formula (XI), like those of the formula (VII), is widely known. In this respect, reference may be made, for example, to R. C. Mehrotra, Indian J. Chem. 5 (1967) 1967 and British Patent 1,184,248 (Dynamit Nobel AG, published on 11 Mar. 1970).

Organo(poly)siloxanes of the formula (XI), like organo(poly)siloxanes of the formula (VII), are preferably prepared by reacting an organosilicon compound (2) with an organic compound (3) containing at least two hydroxyl groups, optionally in the presence of Brönsted acids, the resultant alcohol being removed by distillation during and/or after the reaction.

The organosilicon compound (2) employed is preferably a silane of the formula (VIII) or of the formula (IV), an organo(poly)siloxane of the formula (IX) or of the formula (V), an organo(poly)siloxane of the formula (X) or of the formula (VI) or a mixture thereof, a partial hydrolysate thereof, a partial condensate thereof or a product of the reaction of the partial hydrolysate or partial condensate with $R^2{}_3SiOH$ or $R^2{}_3SiOSiR^2{}_3$, where $R^2$ is as defined above.

Examples of organic compounds (3) containing at least two hydroxyl groups are linear, branched and cyclic alkanols, such as, for example, glycol, 1,3-propanediol, 1,2-propanediol, 1,2-butanediol, 1,3-butanediol, 1,4-butanediol, 1,5-pentanediol, 1,2-pentanediol, 1,6-hexanediol, 1,2-cyclohexanediol, 1,4-cyclohexanediol, glycerol, 1,2,4-butanetriol and 1,2,6-hexanetriol, aromatic alcohols, such as, for example, hydroquinone, pyrocatechol, pyrogallol, 4-hydroxymethylbenzyl alcohol, 1,4-dihydroxynaphthalene and 1,6-dihydroxynaphthalene, and carbohydrates, such as, for example, glucose and fructose.

The reaction is preferably carried out at a temperature of from 50° C. to 200° C. and at a pressure between 900 and 1100 hPa. If desired, however, higher or lower pressures can also be used.

The organo(poly)siloxanes of the formula (XI) employed according to the invention preferably have from to 100, in particular from 4 to 20, siloxane units and preferably have a viscosity of from 2 to 500 mPa.s, particularly preferably from 5 to 100 mPa.s.

The organo(poly)siloxanes of the formula (XI) are preferably

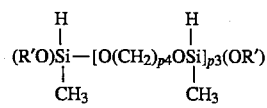

where R' is an alkyl radical, particular preference being given to

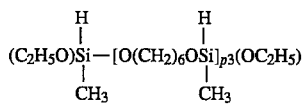

and p3 is a number from 2 to 15 and p4 is a number from 2 to 6.

The present invention furthermore relates to organosilicon compounds of the formula

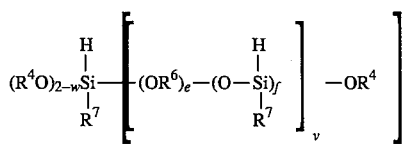

(XIa)

and/or the corresponding partial hydrolysates and/or partial condensates and/or the products of the reaction of these hydrolysates and condensates with $R^2{}_3SiOH$ and/or $R^2{}_3SiOSiR^2{}_3$, where $R^4$ may be identical or different and is a monovalent, optionally substituted hydrocarbon radical or the radical —$SiR^2{}_3$, $R^2$ may be identical or different and is a hydrogen atom or a monovalent organic radical, $R^6$ may be identical or different and is a divalent, optionally substituted organic radical, $R^7$ is a monovalent, SiC-bonded, optionally substituted hydrocarbon radical having 1 to 18 carbon atom(s), e may in each case be identical or different and is 0 or an integer between 1 and 100, f may in each case be identical or different and is 0 or an integer between 1 and 100, v may in each case be identical or different and is an integer between 1 and 100, and w may be 1 or 2, with the proviso that each organosilicon compound molecule contains on average more than one organyloxy radical $R^4O$— where $R^4$ is a monovalent, optionally substituted hydrocarbon radical, and both e and f are on average greater than 0.

Partial hydrolysates or partial condensates of compounds of the formulae (I) and (II) and (IV) to (XI) and products of the reaction thereof with $R^2{}_3SiOH$ and/or $R^2{}_3SiOSiR^2{}_3$ are preferably prepared by slow addition of water to the compound of the formula (I) or (II) or (IV) to (XI) optionally mixed with $R^2{}_3SiOH$ and/or $R^2{}_3SiOSiR^2{}_3$, where $R^2$ is as defined above, and optionally in the presence of Brönsted acids. If compounds of the formula $R^2{}_3SiOH$ and/or $R^2{}_3SiOSiR^2{}_3$ where $R^2$ is as defined above are also used, gelling processes can be substantially avoided, depending on their ratio to the compound of the formula (IV) to (XI) employed. The resultant alcohol is subsequently removed by distillation.

The preparation of these partial hydrolysates or partial condensates and the products of the reaction thereof is preferably carried out at a pressure of from 900 to 1100 hPa and at a temperature of from 23° to 220° C., particularly preferably from 100° to 180° C., but it can also be carried out at higher or lower pressures.

If component (B) is partial hydrolysates, partial condensates, partial cohydrolysates with (C), partial cocondensates with (C) and/or products of the reaction of these hydrolysates and condensates of compounds of the formula (I) or (IV) to (VII), there are of course on average more than two —OR or —$OR^4$ groups per molecule, where R and $R^4$ are optionally substituted hydrocarbon radicals.

If component (C) is partial hydrolysates, partial condensates and/or products of the reaction of these hydrolysates and condensates of compounds of the formula (II) or (VIII) to (XI), there are of course on average more than one —$OR^4$ group per molecule, where $R^4$ is an optionally substituted hydrocarbon radical.

The organo(poly)siloxane compositions according to the invention which can be crosslinked to give elastomers with elimination of alcohols are preferably those which can be prepared from, in each case based on the total weight of the organo(poly)siloxane composition, (A) from 20 to 98 percent by weight, preferably from 40 to 80 percent by weight, particularly preferably from 30 to 70 percent by weight, of α,ω-dihydroxyorgano(poly)siloxane, (B) from 1 to 50 percent by weight, preferably from 2 to 30 percent by weight, particularly preferably from 3 to 20 percent by weight, of an organosilicon compound of the formula (I), (C) from 0 to 50 percent by weight, preferably from 1 to 20 percent by weight, particularly preferably from 2 to 5 percent by weight, of an organosilicon compound of the formula (II), (D) from 0 to 70 percent by weight, preferably from 1 to 60 percent by weight, particularly preferably from 5 to 50 percent by weight, of filler, (E) from 0 to 70 percent by weight, preferably from 0 to 60 percent by weight, particularly preferably from 10 to 50 percent by weight, of plasticiser, (F) from 0 to 20 percent by weight, preferably from 0 to 10 percent by weight, particularly preferably from 1 to 8 percent by weight, of adhesion promoter, (G) from 0 to 20 percent by weight, preferably from 0 to 10 percent by weight, particularly preferably from 1 to 8 percent by weight, of scavenger, (H) from 0 to 10 percent by weight, preferably from 0.01 to 5 percent by weight, particularly preferably from 0.1 to 3 percent by weight, of condensation catalyst and (K) from 0 to 50 percent by weight, preferably from 0.5 to 10 percent by weight, particularly preferably from 1 to 7 percent by weight, of additives, with the proviso that at least one of components (D), (E) and (F) is used if component (B) is a silane of the formula (IV).

The addition of an organosilicon compound of the formula (II) which acts as a chain extender allows the mechanical properties of the organo(poly)siloxane compositions crosslinked to give elastomers with elimination of alcohols to be varied within broad limits. Depending on the amount of organosilicon compound of the formula (II) in the composition according to the invention, the proportion of plasticiser in the composition according to the invention can be reduced or the plasticiser can be omitted entirely.

The fillers (D), plasticisers (E), adhesion promoters (F), scavengers (G), condensation catalyst (H) and additives (K) employed in the organo(poly)siloxane compositions according to the invention may in each case be the same as it was also possible to employ hitherto in organo(poly)siloxane compositions which can be crosslinked to give elastomers with elimination of alcohols, basic constituents being less suitable since they reduce the shelf life of the organo(poly)siloxane compositions.

Examples of fillers (D) are, for example, non-reinforcing fillers, i.e. fillers having a BET surface area of up to 50 m$^2$/g, such as quartz, diatomaceous earth, calcium silicate, zirconium silicate, zeolites, metal oxide powders, such as aluminium oxide, titanium oxide, iron oxide or zinc oxide, or mixed oxides thereof, barium sulphate, calcium carbonate, gypsum, silicon nitride, silicon carbide, boron nitride, glass powders and plastic powders, such as polyacrylonitrile powder; reinforcing fillers, i.e. fillers having a BET surface area of greater than 50 m$^2$/g, such as pyrogenically prepared silicic acid, precipitated silicic acid, carbon black, such as furnace black and acetylene black and silicon/aluminium mixed oxides of large BET surface area; and fibrous fillers, such as asbestos and plastic fibres. Said fillers may have been rendered hydrophobic, for example by treatment with organosilanes or organosiloxanes, or with stearic acid or by etherification of hydroxyl groups to alkoxy groups.

Examples of plasticisers (E) are, for example, dimethylpolysiloxanes which are end-blocked by trimethylsiloxy groups and are liquid at room temperature, and high-boiling hydrocarbons, such as, for example, paraffin oils.

Examples of adhesion promoters (F) employed in the organo(poly)siloxane compositions according to the invention are silanes and organo(poly)siloxanes containing functional groups, such as, for example, those containing aminoalkyl, glycidoxypropyl or methacryloxypropyl radicals, and tetraalkoxy silanes.

Suitable scavengers (G) are all compounds which are capable of scavenging molecules which reduce the shelf life of the organo(poly)siloxane compositions according to the invention, such as, for example, water, alcohol or silanols.

Examples of such scavengers (G) are silanes of the formula $$R^{12}{}_{4-g}SiZ_g \qquad (XII)$$

in which R$^{12}$ may be identical or different and is as defined for R$^7$, Z is an easily removable group, such as, for example, $$-OCR', \overset{O}{\underset{\|}{}}$$

—NR''$_2$ and —OR''', where R', R'' and R''' may in each case be identical or different and are an organic radicals, g is 1, 2, 3 or 4, such as, for example, triacetoxymethylsilane, di(N-methylacetamido)dimethylsilane and diacetoxydimethylsilane, and carboxylic anhydrides, carboxylic esters, isocyanates and molecular sieves. Suitable scavengers for scavenging, in particular, molecular hydrogen are unsaturated organic compounds, as described in U.S. Pat. No. 4,489,191 (General Electric Company; published on 18 Dec. 1989).

Examples of condensation catalysts (H) are (organo)metallic compounds, such as, for example, titanates, organotin compounds, zinc compounds and cobalt compounds, acidic catalysts which are free from metal atoms, such as, for example, carboxylic acids, and basic catalysts which are free from metal atoms, such as, for example, amines.

Of these condensation catalysts, preference is given to acidic catalysts which are free from metal atoms, such as, for example, carboxylic acids, particular preference being given to carboxylic acids such as, for example, hexanoic acid, 2-ethylhexanoic acid, lauric acid, malonic acid and oleic acid.

In addition, the constituent (H) may also be compounds which only develop their action as acidic catalysts in the presence of water, such as, for example, carboxylic anhydrides and acyloxysilanes, such as, for example, acetoxysilanes.

Examples of additives (K) are pigments, dyes, fragrances, fungicides, oxidation inhibitors, agents for influencing the electrical properties, such as conductive black, flameproofing agents, light stabilisers and agents for extending the skin-formation time, such as silanes containing an SiC-bonded mercaptoalkyl radical, cell-generating agents, for example azodicarbonamide, heat stabilisers and thixotropic agents.

In addition, constituents other than constituents (A) to (K) can also be employed in the organo(poly)siloxane compositions according to the invention. These may be the same as it was also possible to employ hitherto in organo(poly)siloxane compositions which can be crosslinked to give elastomers with elimination of alcohols, basic constituents being less suitable since they reduce the shelf life of the organo(poly)siloxane compositions.

Examples of such other constituents are silanes of the formula $$R^{13}{}_mSi(OR^{14})_{4-m} \qquad (XIII)$$

in which R$^{13}$ is as defined for R$^7$, R$^{14}$ is as defined for R, and m is 0 or 1, or partial hydrolysates or partial condensates thereof, such as hexamethoxydisiloxane, resinous organopolysiloxanes, including those comprising R$^{13}{}_3$SiO$_{1/2}$ and SiO$_{4/2}$ units where R$^{13}$ is as defined above, purely organic resins, such as homopolymers or copolymers of acrylonitrile, styrene, vinyl chloride or propylene, corrosion inhibitors, polyglycols, which may be esterified and/or etherified, solvents and mixtures of at least two types of such constituents.

The individual constituents (D), (E), (F), (G), (H) and (K) of the organo(poly)siloxane compositions according to the invention which can be crosslinked with elimination of alcohols may in each case be one type of such constituents or a mixture of at least two types of such constituents.

In order to prepare the compositions according to the invention, all the constituents of the particular composition can be mixed with one another in any desired sequence. This mixing can be carried out at room temperature and at the pressure of the ambient atmosphere, i.e. at from about 900 to 1100 hPa. If desired, however, this mixing can also be carried out at elevated temperatures, for example at temperatures in the range from 35° C. to 135° C. During this mixing, the presence of water is preferably excluded as far as possible.

The invention furthermore relates to a process for the preparation of organo(poly)siloxane compositions which can be crosslinked to give elastomers with elimination of alcohols, characterised in that (A) α,ω-dihydroxyorgano(poly)siloxane, (B) an organosilicon compound of the general formula

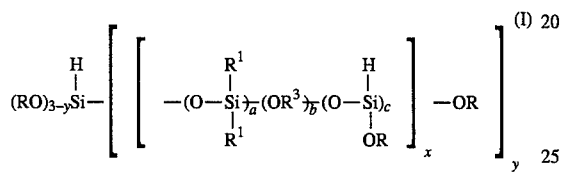

and/or partial hydrolysates thereof and/or partial condensates thereof and/or partial cohydrolysates thereof with (C) and/or partial cocondensates thereof with (C) and/or the products of the reaction of these hydrolysates and condensates with $R^2_3SiOH$ and/or $R^2_3SiOSiR^2_3$, with the proviso that each organosilicon compound molecule contains on average more than two organyloxyradicals RO— or $R^4O$— where R and $R^4$ are monovalent, optionally substituted hydrocarbon radicals, where R may be identical or different and is a monovalent, optionally substituted hydrocarbon radical or the radical —$SiR^2_3$, $R^1$ may be identical or different and is a hydrogen atom, a monovalent organic radical or an organosiloxy group, $R^2$ may be identical or different and is a hydrogen atom or a monovalent organic radical, $R^3$ may be identical or different and is a divalent, optionally substituted organic radical, a may in each case be identical or different and is 0 or an integer between 1 and 1,000, b may in each case be identical or different and is 0 or an integer between 1 and 100, c may in each case be identical or different and is 0 or an integer between 1 and 100, x may in each case be identical or different and is 0 or an integer between 1 and 100, and y may be 1, 2 or 3, and optionally further substances are mixed with one another in any desired sequence, the mixture is stirred, in a 1st step, preferably at a temperature of from 15° to 80° C., particularly preferably from 40° to 50° C., and preferably at a pressure of from 900 to 1,100 hPa, preferably for from 5 to 90 minutes, particularly preferably from 30 to 60 minutes, and subsequently, in a 2nd step, the stirring is continued, preferably at a pressure of from 0.01 to 100 hPa, particularly preferably from 1 to 15 hPa, preferably for from 3 to 60 minutes, particularly preferably from 5 to 30 minutes, the stirring speed being selected so that the temperature of the composition during the stirring increases to a value within the temperature range from 15° C. to 80° C. without further supply of heat.

The further substances optionally employed in the process according to the invention may be the same as it was also possible to employ hitherto in organo(poly)siloxane compositions which can be crosslinked to give elastomers with elimination of alcohols, basic constituents being less suitable since they reduce the shelf life. In particular, these are the abovementioned examples which can be employed for constituents (C), (D), (E), (F), (G), (H), (K) and for the other constituents which can be additionally employed.

In a preferred embodiment of the process according to the invention, (A) α,ω-dihydroxyorgano(poly)siloxane, (B) an organosilicon compound of the general formula

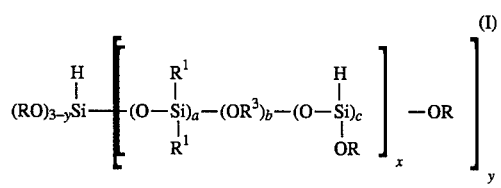

and/or partial hydrolysates thereof and/or partial condensates thereof and/or partial cohydrolysates thereof with (C) and/or partial cocondensates thereof with (C) and/or the products of the reaction of these hydrolysates and condensates with $R^2_3SiOH$ and/or $R^2_3SiOSiR^2_3$, with the proviso that each organosilicon compound molecule contains on average more than two organyloxy radicals RO— or $R^4O$— where R and $R^4$ are monovalent, optionally substituted hydrocarbon radicals, where R may be identical or different and is a monovalent, optionally substituted hydrocarbon radical or the radical —$SiR^2_3$, $R^1$ may be identical or different and is a hydrogen atom, a monovalent organic radical or an organosiloxy group, $R^2$ may be identical or different and is a hydrogen atom or a monovalent organic radical, $R^3$ may be identical or different and is a divalent, optionally substituted organic radical, a may in each case be identical or different and is 0 or an integer between 1 and 1,000, b may in each case be identical or different and is 0 or an integer between 1 and 100, c may in each case be identical or different and is 0 or an integer between 1 and 100, x may in each case be identical or different and is 0 or an integer between 1 and 100, and y may be 1, 2 or 3, and optionally (C) an organosilicon compound of the general formula

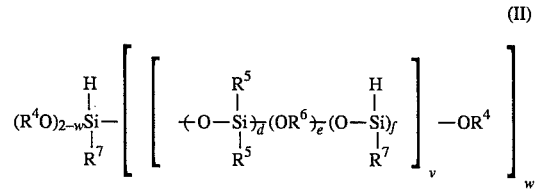

and/or partial hydrolysates thereof and/or partial condensates thereof and/or the products of the reaction of these hydrolysates and condensates with $R^2_3SiOH$ and/or $R^2{}_3SiOSiR^2{}_3$, with the proviso that each organosilicon compound molecule contains on average more than one organyloxy radical $R^4O$— where $R^4$ is a monovalent, optionally substituted hydrocarbon radical, in which $R^4$ may be identical or different and is a monovalent, optionally substituted hydrocarbon radical or the radical —$SiR^2{}_3$, where $R^2$ may be identical or different and is a hydrogen atom or a monovalent organic radical, $R^5$ may be identical or different and is a hydrogen atom, a monovalent organic radical or an organosiloxy group, $R^6$ may be identical or different and is a divalent, optionally substituted organic radical, $R^7$ is a monovalent, SiC-bonded, optionally substituted hydrocarbon radical having 1 to 18 carbon atom(s), d may in each case be identical or different and is 0 or an integer between 1 and 1,000, e may in each case be identical or different and is 0 or an integer between 1 and 100, f may in each case be identical or different and is 0 or an integer between 1 and 100, v may in each case be identical or different and is 0 or an integer between 1 and 100, and w may be 1 or 2, and at least one further substance selected from the group comprising fillers, plasticisers and adhesion promoters, and optionally further substances are mixed with one another in any desired sequence, the mixture is stirred, in a 1st step, preferably at a temperature of from 15° to 80° C., particularly preferably from 40° to 50° C., and preferably at a pressure of from 900 to 1,100 hPa, preferably for from 5 to 90 minutes, particularly preferably from 30 to 60 minutes, and subsequently, in a 2nd step, the stirring is continued, preferably at a pressure of from 0.01 to 100 hPa, particularly preferably from 1 to 15 hPa, preferably for from 3 to 60 minutes, particularly preferably from 5 to 30 minutes, the stirring speed being selected so that the temperature of the composition during the stirring increases to a value within the temperature range from 15° C. to 80° C. without further supply of heat.

The usual water content of air is sufficient for the crosslinking of the compositions according to the invention or the compositions prepared according to the invention. If desired, the crosslinking can also be carried out at higher or lower temperatures than room temperature, for example at from −5° to 10° C. or at from 30° to 50° C.

The organo(poly)siloxane compositions according to the invention or prepared according to the invention and which can be crosslinked to give elastomers with elimination of alcohols have the advantage that they are distinguished by a high crosslinking rate and a long shelf life. Thus, these compositions have a constant vulcanisation behaviour at any time on storage for more than twelve months at room temperature.

In addition, the mechanical properties of the organo(poly)siloxane compositions crosslinked to give elastomers with elimination of alcohols can be varied within broad limits in a relatively simple manner by a suitable choice of the individual constituents, in particular when component (C) is used, in the compositions according to the invention or prepared according to the invention. Furthermore, the organo(poly)siloxane compositions prepared by the process according to the invention have the advantage that they exhibit no evolution of hydrogen even on storage for more than twelve months at room temperature.

A further advantage of the organo(poly)siloxane compositions according to the invention or prepared according to the invention and which can be crosslinked to give elastomers with elimination of alcohols is that, even without metal catalysts, which are in many cases toxicologically unacceptable, they cure very rapidly to give elastomers using only mild condensation catalysts.

The compositions according to the invention or prepared according to the invention can be employed for all purposes for which it is possible to employ organo(poly)siloxane compositions which have a long shelf life in the absence of water, but crosslink in the presence of water at room temperature to give elastomers.

The compositions according to the invention or prepared according to the invention are thus highly suitable, for example, as sealants for joints, including vertical joints, and similar spaces having a width of, for example, from 10 to 40 mm, for example of buildings, land, water and air vehicles, or as adhesives or putties, for example in window installation or in the production of aquaria or display cases, and, for example, for the production of protective coatings, including those for surfaces constantly exposed to fresh water or seawater, or antislip coatings, or of rubber-elastic mouldings, and for the insulation of electrical or electronic equipment.

In the examples described below, all the viscosity data relate to a temperature of 25° C. Unless otherwise stated, the examples below are carried out at the pressure of the ambient atmosphere, i.e. at about 1,000 hPa, and at room temperature, i.e. at about 23° C., or at a temperature which results when the reactants are combined at room temperature without additional heating or cooling. In addition, all parts and percentages relate to the weight, unless otherwise stated.

In the examples below, Shore A hardness is determined in accordance with DIN (Deutsche Industrie Norm) 53 505-87, the tear strength, the elongation at break and the modulus of elasticity (tensile strength after 100% elongation) are each determined in accordance with DIN 53504-85S1, and the tear propagation strength is determined in accordance with ASTM D624B-73.

The number average molecular weight $M_n$ and the weight average molecular weight $M_w$ are determined with the aid of gel permeation chromatography.

Furthermore, the following abbreviations are used:

Me: methyl group,

Et: ethyl group, rpm : revolutions per minute,

Siloxane A: α,ω-dihydroxydimethylpolysiloxane having a viscosity of about 80,000 mPa.s and on average from 900 to 1,000 dimethylsiloxy units, Siloxane B: α,ω-di(trimethylsiloxy)dimethylpolysiloxane having a viscosity of about 100 mPa.s, Siloxane C: α,ω-di(trimethylsiloxy)dimethylpolysiloxane having a viscosity of about 1,000 mPa.s, Siloxane D: α,ω-dihydroxydimethylpolysiloxane having a viscosity of about 350,000 mPa.s and on average from 1,500 to 1,600 dimethylsiloxy units.

EXAMPLE 1

51.5 parts of siloxane A, 30 parts of siloxane B, 5.2 parts of hydrotriethoxysilane, 0.4 part of oleic acid and 12 parts of pyrogenic silicic acid (obtainable as HDK H 15 from Wacker-Chemie GmbH, D-8000 Munich) are mixed for 40 minutes with exclusion of air in a 5 l planetary mixer (type FH6-S from Drais-Werke GmbH, D-6800 Mannheim) at a speed of 160 rpm and at a temperature of from 40° to 50° C., and the mixture is subsequently stirred for a further 10 minutes at a speed of 160 rpm and at a pressure of from 0.1 to 1.5 kPa. The resultant composition is transferred in tubes with exclusion of moisture and stored at a temperature of 50° C. No change in the composition and no evolution of hydrogen in the tube is observed over an observation period of several months.

Films having a thickness of 2 mm are produced from the resultant composition after storage for one day by applying the composition to a surface of polytetrafluoroethylene using a spatula and exposing the film to atmospheric moisture. The time until a dry surface forms (skin-formation time) is determined. After two weeks from application, the resultant dry films are analysed for their mechanical proeprties. Data on the skin-formation time and the mechanical properties are given in Table 1.

EXAMPLE 2

51.0 parts of siloxane A, 30 parts of siloxane B, 6.0 parts of hydrotriethoxysilane, 0.6 part of oleic acid, 35 parts of dolomite (obtainable under the name Microdol S from Norwegian Talc Minerals A.S., N-5355 Knarrevik) and 12 parts of pyrogenic silicic acid (obtainable as HDK H 15 from Wacker-Chemie GmbH, D-8000 Munich) are mixed for 40 minutes with exclusion of air in a 5 l planetary mixer (type FH6-S from Drais-Werke GmbH, D-6800 Mannheim) at a speed of 160 rpm and at a temperature of from 40° to 50° C., and the mixture is subsequently stirred for a further 10 minutes at a speed of 160 rpm and at a pressure of from 0.1 to 1.5 kPa. Otherwise, the procedure is as described in Example 1.

No change in the composition and no evolution of hydrogen in the tube is observed over an observation period of several months. Data on the skin-formation time and the mechanical properties are given in Table 1.

EXAMPLE 3

51.0 parts of siloxane A, 30 parts of siloxane B, 6.0 parts of hydrotriethoxysilane, 0.6 part of oleic acid, 60 parts of chalk (obtainable under the name Omya BLR/3 from Omya GmbH, D-5000 Cologne) and 15 parts of pyrogenic silicic acid (obtainable as HDK H 15 from Wacker-Chemie GmbH, D-8000 Munich) are mixed for 40 minutes with exclusion of air in a 5 l planetary mixer (type FH6-S from Drais-Werke GmbH, D-6800 Mannheim) at a speed of 160 rpm and at a temperature of from 40° to 50° C., and the mixture is subsequently stirred for a further 10 minutes at a speed of 160 rpm and at a pressure of from 0.1 to 1.5 kPa. Otherwise, the procedure is as described in Example 1.

No change in the composition and no evolution of hydrogen in the tube is observed over an observation period of several months. Data on the skin-formation time and the mechanical properties are given in Table 1.

EXAMPLE 4

The procedure described in Example 2 is repeated with the difference that in addition 1.35 parts of each of the following substances are added:
Example 4a: 3-triethoxysilylpropylsuccinic anhydride (obtainable from Wacker-Chemie GmbH, D-8000 Munich, under the name GF 20)
Example-4b: acetic anhydride
Example 4c: triacetoxymethylsilane
No change in the composition and no evolution of hydrogen in the tube is observed over an observation period of several months. Data on the skin-formation time and the mechanical properties are given in Table 1.

EXAMPLE 5

51.5 parts of siloxane A, 30 parts of siloxane B, 5.2 parts of hydrotriethoxysilane, 0.3 part of 2-ethylhexanoic acid and 16 parts of pyrogenic silicic acid (obtainable as HDK H 15 from Wacker-Chemie GmbH, D-8000 Munich) are mixed for 40 minutes with exclusion of air in a 5 l planetary mixer (type FH6-S from Drais-Werke GmbH, D-6800 Mannheim) at a speed of 160 rpm and at a temperature of from 40° to 50° C., and the mixture is subsequently stirred for a further 10 minutes at a speed of 160 rpm and at a pressure of from 0.1 to 1.5 kPa. Otherwise, the procedure is as described in Example 1.

No change in the composition and no evolution of hydrogen in the tube is observed over an observation period of several months. Data on the skin-formation time and the mechanical properties are given in Table 1.

In order to determine the adhesive power, in each case one part of the resultant composition is applied to the substrates indicated in Table 2, freed from contamination, such as dust and grease, and allowed to crosslink under ambient conditions. After two weeks from application, the resultant dry elastomers are removed from the respective substrate. The results are given in Table 2.

EXAMPLE 6

The procedure described in Example 5 is repeated with the difference that in addition 1.6 parts of each of the following substances are added:
Example 6a: 3-glycidoxypropyltriethoxysilane (obtainable from Wacker-Chemie GmbH, D-8000 Munich, under the name GF 82)
Example 6b: 3-methacryloxypropyltrimethoxysilane (obtainable from Wacker-Chemie GmbH, D-8000 Munich, under the name GF 31)
Example 6c: 3-triethoxysilylpropylsuccinic anhydride (obtainable from Wacker-Chemie GmbH, D-8000 Munich, under the name GF 20)
No change in the composition and no evolution of hydrogen in the tube is observed over an observation period of several months. Data on the skin-formation time and the mechanical properties are given in Table 1.

Results of the adhesive power are given in Table 2.

TABLE 1

| Ex. | Tear strength (N/mm$^2$) | Elongation at break (%) | Modulus of elasticity (N/mm$^2$) | Shore A hardness | Tear propagation strength (N/mm) | $t_1$ in min. |
| --- | --- | --- | --- | --- | --- | --- |
| 1 | 2.2 | 420 | 0.5 | 23 | 6.0 | 15 |
| 2 | 2.1 | 360 | 0.8 | 31 | 8.8 | 18 |
| 3 | 1.9 | 410 | 0.6 | 33 | 6.8 | 10 |
| 4a | 2.5 | 400 | 0.8 | 38 | 9.7 | 5 |
| 4b | 2.4 | 410 | 0.8 | 33 | 9.0 | 17 |
| 4c | 1.8 | 340 | 0.7 | 33 | 8.5 | 6 |
| 5 | 2.6 | 330 | 0.8 | 36 | 7.7 | 5 |
| 6a | 2.0 | 290 | 0.8 | 35 | 9.0 | 5 |
| 6b | 2.6 | 370 | 0.8 | 34 | 8.4 | 8 |
| 6c | 3.0 | 420 | 0.9 | 40 | 10.1 | 3 |

TABLE 2

| Ex. | Concrete | Aluminium | Iron | Glass | Ceramic | Wood[1] | Wood[2] |
|---|---|---|---|---|---|---|---|
| 5 | A | A | A | C | C | A | AC |
| 6a | A | C | C | C | C | A | C |
| 6b | A | C | C | C | C | A | C |
| 6c | C | C | C | C | C | A | C |

[1] Untreated
[2] Varnished
A: The elastomer is separated from the substrate
C: The elastomer tears on removal
AC: Both case A and case C occur

EXAMPLE 7

51.5 parts of siloxane A, 0.3 part of oleic acid and the amount indicated in Table 3 of hydrodiethoxymethylsilane are mixed for 15 minutes under a nitrogen atmosphere with exclusion of air in a 5 l planetary mixer (type FH6-S from Drais-Werke GmbH, D-6800 Mannheim). 30 parts of siloxane B, the amount indicated in Table 3 of hydrotriethoxysilane and 12 parts of pyrogenic silicic acid (obtainable as HDK H 15 from Wacker-Chemie GmbH, D-8000 Munich) are subsequently added, the components are mixed intimately for 30 minutes at a speed of 160 rpm and at a temperature of from 40° to 50° C., and the mixture is subsequently stirred for a further 10 minutes at a speed of 160 rpm and at a pressure of from 0.1 to 1.5 kPa. Otherwise, the procedure is as described in Example 1.

TABLE 3

| Example | Hydrodiethoxymethylsilane (parts) | Hydrotriethoxysilane (parts) |
|---|---|---|
| 7a | — | 6.0 |
| 7b | 1.0 | 5.0 |
| 7c | 2.0 | 4.0 |
| 7d | 3.0 | 3.0 |
| 7f | 4.0 | 2.0 |

No change in the composition and no evolution of hydrogen in the tube is observed over an observation period of several months. Data on the skin-formation time and the mechanical properties are given in Table 4.

EXAMPLE 8

51.5 parts of siloxane A and the amount indicated in Table 5 of hydrodiethoxymethylsilane are mixed for 15 minutes under a nitrogen atmosphere with exclusion of air in a 5 l planetary mixer (type FH6-S from Drais-Werke GmbH, D-6800 Mannheim). 30 parts of siloxane B, the amount indicated in Table 5 of hydrotriethoxysilane, 0.6 part of oleic acid, 35 parts of dolomite (obtainable under the name Microdol S from Norwegian Talc Minerals A.S., N-5355 Knarrevik) and 12 parts of pyrogenic silicic acid (obtainable as HDK H 15 from Wacker-Chemie GmbH, D-8000 Munich) are subsequently added, the components are mixed intimately for 30 minutes at a speed of 160 rpm and at a temperature of from 40° to 50° C., and the mixture is subsequently stirred for a further 10 minutes at a speed of 160 rpm and at a pressure of from 0.1 to 1.5 kPa. Otherwise, the procedure is as described in Example 1.

TABLE 5

| Example | Hydrodiethoxymethylsilane (parts) | Hydrotriethoxysilane (parts) |
|---|---|---|
| 8a | — | 6.0 |
| 8b | 3.0 | 3.0 |
| 8c | 4.0 | 2.0 |

No change in the composition and no evolution of hydrogen in the tube is observed over an observation period of several months. Data on the skin-formation time and the mechanical properties are given in Table 4.

EXAMPLE 9

70.0 parts of α,ω-dihydroxydimethylpolysiloxane having a viscosity of about 20,000 mPa.s and containing on average from 600 to 700 dimethylsiloxy units, and 7.00 parts of hydrodiethoxymethylsilane are mixed for 15 minutes under a nitrogen atmosphere with exclusion of air in a 5 l planetary mixer (type FH6-S from Drais-Werke GmbH, D-6800 Mannheim). 1.40 parts of hydrotriethoxysilane, 1.20 parts of oleic acid, 35 parts of dolomite (obtainable under the name Microdol S from Norwegian Talc Minerals A.S., N-5355 Knarrevik) and 13 parts of pyrogenic silicic acid (obtainable as HDK H 15 from Wacker-Chemie GmbH, D-8000 Munich) are subsequently added, the components are mixed intimately for 30 minutes at a speed of 160 rpm and at a temperature of from 40° to 50° C., and the mixture is subsequently stirred for a further 10 minutes at a speed of 160 rpm and at a pressure of from 0.1 to 1.5 kPa. Otherwise, the procedure is as described in Example 1.

No change in the composition and no evolution of hydrogen in the tube is observed over an observation period of several months. Data on the skin-formation time and the mechanical properties are given in Table 4.

TABLE 4

| Ex. | Tear strength (N/mm$^2$) | Elongation at break (%) | Modulus of elasticity (N/mm$^2$) | Shore A hardness | Tear propagation strength (N/mm) | $t_1$ in min. |
|---|---|---|---|---|---|---|
| 7a | 2.0 | 350 | 0.6 | 25 | 6.9 | 12 |
| 7b | 1.3 | 310 | 0.4 | 22 | 5.7 | 17 |
| 7c | 1.3 | 350 | 0.4 | 21 | 6.0 | 22 |
| 7d | 1.3 | 460 | 0.3 | 15 | 5.5 | 22 |
| 7f | 1.5 | 550 | 0.2 | 13 | 4.9 | 30 |
| 8a | 2.1 | 360 | 0.8 | 31 | 8.8 | 18 |
| 8b | 1.9 | 390 | 0.6 | 27 | 8.6 | 17 |
| 8c | 1.4 | 680 | 0.3 | 18 | 8.5 | 20 |
| 9 | 2.1 | 620 | 0.6 | 29 | 9.6 | 15 |

EXAMPLE 10

Polymer 1

72.1 g of α,ω-dihydroxydimethylsiloxane containing on average 13 dimethylsiloxy units, 65.7 g of hydrotriethoxysilane (Silicon Compounds Register and Review; Petrarch Systems: Silane and Silicones, ABCR Karlsruhe GmbH and Co., D-7500 Karlsruhe) and 1.38 g of anhydrous acetone are warmed at 80° C. for 45 minutes on a rotary evaporator with exclusion of moisture and subsequently heated at a pressure of from 0.1 to 1.5 kPa and a temperature of 80° C. for about 40 minutes. 85 g of a clear, colourless liquid having a viscosity of about 20 mPa.s which, according to $^{29}$Si-NMR spectroscopy, contains more than 100% of H-Si(OEt)$_2$ terminal groups, are obtained.

52 parts of siloxane D, the amount indicated in Table 5a of siloxane B or siloxane C, 35.0 parts of polymer 1, 0.4 part of oleic acid and 18 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The resultant composition is transferred in tubes with exclusion of moisture and stored at a temperature of 50° C. No change in the composition and no evolution of hydrogen in the tube is observed over an observation period of 30 days.

Films having a thickness of 2 mm are produced from the resultant composition after storage for one day by applying the composition to the surface of polytetrafluoroethylene using a spatula and exposing the film to atmospheric moisture. The time until a dry surface forms (skin-formation time) is determined. After two weeks from application, the resultant dry films are analysed for their mechanical properties. Data on the skin-formation time and the mechanical properties are given in Table 6.

TABLE 5a

| Example | Siloxane B [parts] | Siloxane C [parts] |
|---------|--------------------|--------------------|
| 10a | 60 | — |
| 10b | 80 | — |
| 10c | — | 60 |

EXAMPLE 11

Polymer 2

40.7 g of polymer 1, whose preparation is described in Example 10, 3.00 g of trimethylsilanol and 0.44 g of 2-ethylhexanoic acid are warmed at 80° C. for 30 minutes on a rotary evaporator with exclusion of moisture and subsequently heated at a pressure of from 0.1 to 1.5 kPa and a temperature of 80° C. for about 40 minutes. 42 g of a clear, colourless liquid having a viscosity of 25 mPa.s are obtained.

52 parts of siloxane D, 25 parts of siloxane B, 35.0 parts of polymer 2, 0.4 part of oleic acid and 16 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are given in Table 6.

EXAMPLE 12

52 parts of siloxane D, 30 parts of siloxane B, 40.0 parts of polymer 2, whose preparation is described in Example 11, 0.4 part of oleic acid and 14 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are given in Table 6.

EXAMPLE 13

The procedure described in Example 12 is repeated with the difference that the 0.4 part of oleic acid is replaced by 1.0 part of oleic acid.

No change in the composition and no evolution of hydrogen in the tube is observed over an observation period of 30 days. Data on the skin-formation time and the mechanical properties are given in Table 6.

EXAMPLE 14

52 parts of siloxane A, 30 parts of polymer 2, whose preparation is described in Example 11, 2.0 parts of hydrotriethoxysilane, 0.4 part of oleic acid and 10 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are given in Table 6.

TABLE 6

| Ex. | Tear strength (N/mm$^2$) | Elongation at break (%) | Modulus of elasticity (N/mm$^2$) | Shore A hardness | Tear propagation strength (N/mm) | $t_1$ in min. |
|-----|--------------------------|-------------------------|----------------------------------|------------------|----------------------------------|---------------|
| 10a | 1.2 | 110 | 1.1 | 46 | 3.6 | 30 |
| 10b | 0.8 | 113 | 0.8 | 39 | 3.2 | 30 |
| 10c | 3.5 | 149 | 1.9 | 50 | 4.3 | 22 |
| 11  | 1.9 | 170 | 1.3 | 37 | 6.0 | 15 |
| 12  | 1.6 | 190 | 0.9 | 31 | 3.1 | 40 |
| 13  | 1.1 | 144 | 1.1 | 29 | 3.2 | 30 |
| 14  | 2.6 | 130 | 1.9 | 45 | 5.0 | 25 |

EXAMPLE 15

Polymer 3

83.9 g of α,ω-dihydroxydimethylsiloxane containing on average 13 dimethylsiloxy units, 80.6 g of hydrodiethoxymethylsilane and 0.82 g of 2-ethylhexanoic acid are warmed at 80° C. for 120 minutes on a rotary evaporator with exclusion of moisture and subsequently heated at a pressure of from 0.1 to 1.5 kPa and a temperature of 100° C. for about 60 minutes. 85 g of a clear, colourless liquid having a viscosity of about 20 mPa.s which, according to $^{29}$Si-NMR spectroscopy, contains more than 100% of H-SiMe(OEt)$_2$ terminal groups, are obtained.

52 parts of siloxane D, the amount indicated in Table 7 of polymer 1, whose preparation is described in Example 10, and polymer 3, 1.05 parts of oleic acid, 25 parts of dolomite (commercially available as Microdol S from Norwegian Talc Minerals A.S., N-5355 Knarrevik) and parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 8.

TABLE 7

| Example | Polymer 1 [parts] | Polymer 3 [parts] |
|---|---|---|
| 15a | 42 | — |
| 15b | 21 | 21 |
| 15c | 7 | 35 |

EXAMPLE 16

60 parts of siloxane A, 28 parts of polymer 1, whose preparation is described in Example 10, 6.0 parts of hydrotriethoxysilane, 1.05 parts of oleic acid, 35 parts of dolomite (commercially available as Microdol S from Norwegian Talc Minerals A.S., N-5355 Knarrevik) and 11 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 8.

EXAMPLE 17

52 parts of siloxane A, 30 parts of polymer 1, whose preparation is described in Example 10, 5.0 parts of hydrotriethoxysilane, 1.0 part of oleic acid, and 14 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 8.

TABLE 8

| Ex. | Tear strength (N/mm$^2$) | Elongation at break (%) | Modulus of elasticity (N/mm$^2$) | Shore A hardness | Tear propagation strength (N/mm) | $t_1$ in min. |
|---|---|---|---|---|---|---|
| 15a | 1.9 | 170 | 1.3 | 37 | 6.0 | 25 |
| 15b | 1.6 | 140 | 1.1 | 33 | 2.6 | 40 |
| 15c | 1.9 | 315 | 0.8 | 34 | 5.2 | 120 |
| 16 | 1.2 | 335 | 1.2 | 26 | 4.5 | 10 |
| 17 | 2.6 | 240 | 1.0 | 35 | 5.5 | 10 |

EXAMPLE 18

Crosslinking agent 1

13.5 g (0.75 mol) of water are added dropwise over a period of 15 minutes to a mixture of 164 g (1 mol) of hydrotriethoxysilane and 20 mg of acetic acid under nitrogen and with stirring, during which the mixture warms to 45° C. After the mixture has been stirred for a further hour, the ethanol formed is removed by distillation on a rotary evaporator (1016 kPa/120° C.), and the crude product is subsequently heated at 100° C. and from 10 to 15 hPa. 68.3 g of a colourless liquid having a number average molecular weight $M_n$ of 461 and a ratio between the weight average molecular weight $M_w$ and the number average molecular weight $M_n$ of 1.54, which, according to $^{29}$Si-NMR spectroscopy, has on average the following empirical formula, are obtained:

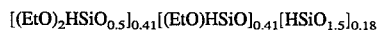

$[(EtO)_2HSiO_{0.5}]_{0.41}[(EtO)HSiO]_{0.41}[HSiO_{1.5}]_{0.18}$

The components indicated in Table 9 are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 10.

TABLE 9

| Ex. | Siloxane A [PTS.] | Siloxane B [PTS.] | Siloxane D [PTS.] | Crosslinking agent 1 [PTS.] | Oleic acid [PTS.] | Pyrogenic silicic acid[1] [PTS.] | Dolomite[2] [PTS.] |
|---|---|---|---|---|---|---|---|
| 18a | 52 | 40 | — | 10 | 0.4 | 8 | — |
| 18b | 52 | 40 | — | 10 | 0.4 | 10 | — |
| 18c | 52 | 40 | — | 10 | 0.4 | 12 | — |
| 18d | 60 | 60 | — | 12 | 0.6 | 4 | 55 |
| 18e | 60 | 60 | — | 12 | 0.6 | 6 | 55 |
| 18f | 60 | 60 | — | 12 | 0.6 | 8 | 55 |
| 18g | 60 | 40 | — | 18 | 0.6 | 12 | 45 |
| 18h | 50 | 40 | 10 | 10 | 0.6 | 10 | 55 |
| 18k | 52 | 40 | — | 10 | 0.4 | 10 | — |

[1] Obtainable as HDK H 15 from Wacker-Chemie GmbH, D-8000 Munich
[2] Obtainable as Microdol S from Norwegian Talc Minerals A.S., N-5355 Knarrevik
PTS. = Parts

TABLE 10

| Ex. | Tear strength (N/mm²) | Elongation at break (%) | Modulus of elasticity (N/mm²) | Shore A hardness | Tear propagation strength (N/mm) | $t_1$ in min. |
|---|---|---|---|---|---|---|
| 18a | 1.0 | 270 | 0.5 | 21 | 3.4 | 16 |
| 18b | 1.1 | 270 | 0.5 | 27 | 4.5 | 13 |
| 18c | 1.7 | 290 | 0.6 | 28 | 5.1 | 10 |
| 18d | 1.0 | 250 | 0.4 | 16 | 2.6 | 60 |
| 18e | 1.4 | 340 | 0.5 | 19 | 3.0 | 35 |
| 18f | 1.6 | 330 | 0.6 | 21 | 3.4 | 30 |
| 18g | 1.9 | 196 | 1.1 | 43 | 6.1 | 12 |
| 18h | 1.9 | 190 | 1.1 | 43 | 6.1 | 15 |
| 18k | 1.1 | 270 | 0.6 | 27 | 4.5 | 13 |

EXAMPLE 19

Crosslinking agent 2

20 mg of acetic acid are added to a mixture of 164 g (1 mol) of hydrotriethoxysilane and 35.6 g of trimethylsilanol, and the mixture is stirred for 15 minutes. 13.5 g (0.75 mol) of water are subsequently added dropwise to this mixture over a period of 15 minutes under nitrogen and with stirring, during which the mixture warms to 45° C. After the mixture has been stirred for a further hour, the ethanol formed is removed by distillation on a rotary evaporator (1016 kPa/ 120° C.), and the crude product is subsequently heated at 100° C. and from 10 to 15 hPa. 104 g of a colourless liquid having a number average molecular weight $M_n$ of 520 and a ratio between the weight average molecular weight $M_w$ and the number average molecular weight $M_n$ of 1.61 are obtained.

Crosslinking agent 3

The procedure described above for the preparation of crosslinking agent 2 is repeated with the difference that the 35.6 g of trimethylsilanol are replaced by 53.4 g of trimethylsilanol. 95.2 g of a colourless liquid having a number average molecular weight $M_n$ of 555 and a ratio between the weight average molecular weight $M_w$ and the number average molecular weight $M_n$ of 1.63 are obtained.

50 parts of siloxane A, 10.0 parts of siloxane D, 40 parts of siloxane B, the amount and type indicated in Table 11 of crosslinking agent, 0.6 part of oleic acid, 55 parts of dolomite (commercially available as Microdol S from Norwegian Talc Minerals A.S., N-5355 Knarrevik) and 10 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 12.

TABLE 11

| Example | Crosslinking agent 1[3] [parts] | Crosslinking agent 2 [parts] | Crosslinking agent 3 [parts] |
|---|---|---|---|
| 19a | — | 20 | — |
| 19b | — | — | 20 |
| 19c | — | — | 15 |
| 19d | 3 | — | 15 |

[3] Preparation described in Example 18.

EXAMPLE 20

52 parts of siloxane A, 40 parts of siloxane B, 10.0 parts of crosslinking agent 2, whose preparation is described in Example 19, 0.4 part of oleic acid and 10 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 12.

TABLE 12

| Ex. | Tear strength (N/mm²) | Elongation at break (%) | Modulus of elasticity (N/mm²) | Shore A hardness | Tear propagation strength (N/mm) | $t_1$ in min. |
|---|---|---|---|---|---|---|
| 19a | 1.4 | 330 | 0.5 | 32 | 4.5 | 30 |
| 19b | 1.1 | 480 | 0.3 | 18 | 4.4 | 130 |
| 19c | 0.7 | 490 | 0.2 | 17 | 4.0 | 175 |
| 19d | 1.1 | 420 | 0.3 | 20 | 3.7 | 75 |
| 20 | 1.2 | 480 | 0.3 | 20 | 4.0 | 35 |

EXAMPLE 21

Crosslinking agent 4

A mixture of 48.1 g of (HMeSiO)$_4$, 32.9 g of hydrotriethoxysilane and 0.01 g of PNCl$_2$ (10% strength solution in trichloroethylene) is heated at 80° C. for 2 hours, and 1.00 g of MgO is subsequently added. The mixture is stirred for 30 minutes, filtered and then distilled at 80° C. and from 0.1 to 1.5 kPa. 68.9 g of a colourless liquid having a number average molecular weight $M_n$ of 390 and a ratio between the weight average molecular weight $M_w$ and the number average molecular weight $M_n$ of 1.95 which, according to $^{29}$Si-NMR spectroscopy, has on average the following empirical formula, are obtained:

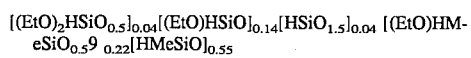

50 parts of siloxane A, 10.0 parts of siloxane D, 40 parts of siloxane B, the amount and type indicated in Table 13 of crosslinking agent, 1.05 parts of oleic acid, 55 parts of dolomite (commercially available as Microdol S from Norwegian Talc Minerals A.S., N-5355 Knarrevik) and the amount indicated in Table 13 of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 14.

TABLE 13

| Example | Crosslinking agent 1[3] [parts] | Crosslinking agent 4 [parts] | Pyrogenic silicic acid [parts] |
| --- | --- | --- | --- |
| 21a | — | 7 | 10 |
| 21b | — | 10 | 10 |
| 21c | — | 10 | 8 |
| 21d | 2 | 10 | 9 |
| 21e | 4 | 10 | 9 |
| 21f | 6 | 10 | 9 |

[3]Preparation described in Example 18.

EXAMPLE 22

52 parts of siloxane A, 40 parts of siloxane B, 10.0 parts of crosslinking agent 4, whose preparation is described in Example 21, 3.0 parts of crosslinking agent 1, whose preparation is described in Example 18, 0.4 part of oleic acid and 10 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 14.

TABLE 14

| Ex. | Tear strength (N/mm$^2$) | Elongation at break (%) | Modulus of elasticity (N/mm$^2$) | Shore A hardness | Tear propagation strength (N/mm) | $t_1$ in min. |
| --- | --- | --- | --- | --- | --- | --- |
| 21a | 1.0 | 1020 | 0.07 | 4 | 4.4 | 300 |
| 21b | 0.9 | 680 | 0.2 | 7 | 3.8 | 300 |
| 21c | 0.6 | 670 | 0.08 | 9 | 2.4 | 240 |
| 21d | 1.2 | 520 | 0.2 | 13 | 3.1 | 95 |
| 21e | 1.5 | 500 | 0.2 | 15 | 3.1 | 45 |
| 21f | 1.0 | 380 | 0.3 | 17 | 3.4 | 40 |
| 22 | 1.1 | 400 | 0.3 | 14 | 3.5 | 20 |

EXAMPLE 23

Copolymer 1

A mixture of 29.6 g of 1,6-hexanediol (obtainable from Aldrich-Chemie GmbH & Co. KG, D-7924 Steinheim) and 164 g of hydrotriethoxysilane are heated at 110° C. with 30 mg of acetic acid for a period of 4 hours, during which about 25 g of ethanol distil off. The residual ethanol formed and excess hydrotriethoxysilane are subsequently removed by distillation at 80° C. and from 0.1 to 1.5 hPa. 76.0 g of a colourless liquid having a number average molecular weight $M_n$ of 323 and a ratio between the weight average molecular weight $M_w$ and the number average molecular weight $M_n$ of 2.83 are obtained.

50 parts of siloxane A, 10.0 parts of siloxane D, parts of siloxane B, the amount indicated in Table 15 of copolymer 1, 0.6 part of oleic acid, 80 parts of dolomite (commercially available as Microdol S from Norwegian Talc Minerals A.S., N-5355 Knarrevik) and 10 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried, out using the resultant composition. No change in the composition and no evolution of hydrogen in the tube is observed over an observation period of 30 days. Data on the skin-formation time and the mechanical properties are shown in Table 17.

TABLE 15

| Example | Copolymer 1 [parts] |
| --- | --- |
| 23a | 12 |
| 23b | 9 |
| 23c | 6 |

EXAMPLE 24

52 parts of siloxane A, 40.0 parts of siloxane B, the amount indicated in Table 16 of copolymer 1, whose preparation is described in Example 23, 0.4 part of oleic acid and 10 parts of pyrogenic silicic acid (obtainable as HDK H 15 from Wacker-Chemie GmbH, D-8000 Munich) are mixed for 35 minutes with exclusion of air in a 5 l planetary mixer (type FH6-S from Drais-Werke GmbH, D-6800 Mannheim) at a speed of 160 rpm and at a temperature of from 45° to 50° C., and the mixture is subsequently stirred for a further 20 minutes at a speed of 160 rpm and at a pressure of from 1 to 2 kPa. The procedure described in Example 10 is carried out using the resultant composition. No change in the composition and no evolution of hydrogen in the tube is observed over an observation period of 30 days. Data on the skin-formation time and the mechanical properties are shown in Table 17.

TABLE 16

| Example | Copolymer 1 [parts] |
| --- | --- |
| 24a | 10 |
| 24b | 7 |

TABLE 17

| Ex. | Tear strength (N/mm$^2$) | Elongation at break (%) | Modulus of elasticity (N/mm$^2$) | Shore A hardness | Tear propagation strength (N/mm) | $t_1$ in min. |
| --- | --- | --- | --- | --- | --- | --- |
| 23a | 1.1 | 820 | 0.2 | 11 | 4.7 | 24 |
| 23b | 1.3 | 870 | 0.1 | 11 | 4.8 | 30 |
| 23c | 1.5 | 900 | 0.1 | 10 | 4.7 | 35 |

TABLE 17-continued

| Ex. | Tear strength (N/mm$^2$) | Elongation at break (%) | Modulus of elasticity (N/mm$^2$) | Shore A hardness | Tear propagation strength (N/mm) | $t_1$ in min. |
|---|---|---|---|---|---|---|
| 24a | 1.3 | 500 | 0.3 | 15 | 5.0 | 30 |
| 24b | 1.2 | 490 | 0.3 | 15 | 4.5 | 30 |

EXAMPLE 25

Copolymer 2

A mixture of 39.4 g of 1,6-hexanediol and 134 g of hydrodiethoxymethylsilane are heated at 90° C. with 30 mg of acetic acid for a period of 4 hours, during which about 34 g of ethanol distil off. The residual ethanol formed and excess hydrodiethoxymethylsilane are subsequently removed by distillation at 80° C. and from 0.1 to 1.5 hPa. 76.9 g of a colourless liquid having a number average molecular weight $M_n$ of 250 and a ratio between the weight average molecular weight $M_w$ and the number average molecular weight $M_n$ of 1.93 are obtained.

EXAMPLE 26

Colpolymer 3

A mixture of 18.2 g of glucose and 164 g of hydrotriethoxysilane are heated at 120° C. with 30 mg of acetic acid for a period of 5 hours, during which about 20 g of ethanol distil off. The residual ethanol formed and excess hydrotriethoxysilane are subsequently removed by distillation at 80° C. and from 0.1 to 1.5 hPa. 56.4 g of a colourless liquid are obtained.

The resultant copolymer 3 cures in air within 30 minutes to give a hard, transparent film.

We claim:

1. An organo(poly)siloxane composition which can be cross-linked to give elastomers with elimination of alcohols comprising (A) α,ω-dihydroxyorgano(poly)siloxane, (B) an organosilicon compound of the general formula

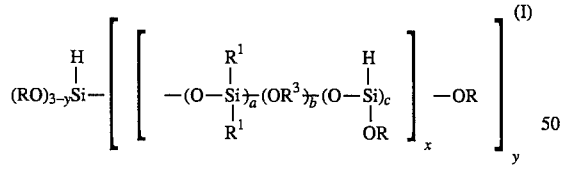

(I)

where

R is a monovalent, optionally substituted hydrocarbon radical or an —SiR$^2_3$ radical, R$^1$ is a hydrogen atom, a monovalent organic radical or an organosiloxy group, R$^2$ is a hydrogen atom or a monovalent organic radical, R$^3$ is a divalent, optionally substituted organic radical, a is 0 or an integer between 1 and 1,000, b is 0 or an integer between 1 and 100, c is 0 or an integer between 1 and 100, x is 0 or an integer between 1 and 100, and y is 1, 2 or 3, with the proviso that each organosilicon compound molecule of formula (I) contains an average of more than two organyloxy radicals RO—, where R is a monovalent, optionally substituted hydrocarbon radical, and optionally (C) an organosilicon compound of the general formula

(II)

where

R$^4$ is a monovalent, optionally substituted hydrocarbon radical or an —SiR$^2_3$ radical, R$^2$ is a hydrogen atom or a monovalent organic radical, R$^5$ is a hydrogen atom, a monovalent organic radical or an organosiloxy group, R$^6$ is a divalent, optionally substituted organic radical, R$^7$ is a monovalent, SiC-bonded, optionally substituted hydrocarbon radical having 1 to 18 carbon atom(s), d is 0 or an integer between 1 and 1,000, e is 0 or an integer between 1 and 100, f is 0 or an integer between 1 and 100, v is 0 or an integer between 1 and 100, and w is 1 or 2, with the proviso that each organosilicon molecule of formula (II) contains an average of more than one organyloxy radical R$^4$O—, where R$^4$ is a monovalent, optionally substituted hydrocarbon radical and in the case where x=0 or a+b+c=0, at least one additional substance selected from the group consisting of fillers, plasticisers and adhesion promoters is present.

2. The organo(poly)siloxane composition of claim 1, wherein component (A) is an α,ω-dihydroxydiorgano(poly)siloxane of the general formula

(III)

in which R$^8$ is a monovalent, SiC-bonded organic radical and n is a number of at least 20.

3. The organo(poly)siloxane composition of claim 1 wherein component (B) is selected from the group consisting of (RO)$_3$—Si—H  (IV)

where

R is a monovalent, optionally substituted hydrocarbon radical or an —SiR$^2_3$ radical, R$^2$ is a hydrogen atom or a monovalent organic radical,

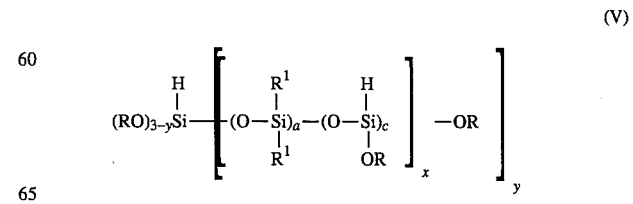

(V)

where

R is a monovalent, optionally substituted hydrocarbon radical or an —SiR²₃ radical, R² is the same as above, R¹ is a hydrogen atom, a monovalent organic radical or an organosiloxy group, a is 0 or an integer between 1 and 1,000, c is 0 or an integer between 1 and 100, x is 0 or an integer between 1 and 100, and y is 1, 2 or 3, and a and c are each on average greater than 0,

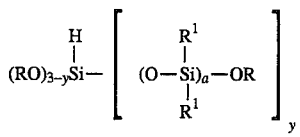

where

R is a monovalent, optionally substituted hydrocarbon radical or an —SiR²₃ radical, R¹ is a hydrogen atom, a monovalent organic radical or an organosiloxy group, R² is a hydrogen atom or a monovalent organic radical, a is a integer between 1 and 1,000, and y is 1, 2 or 3,

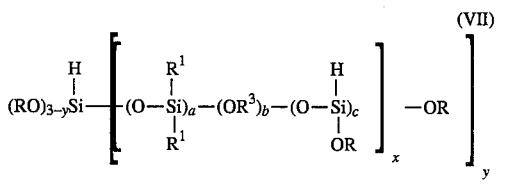

where

R is a monovalent, optionally substituted hydrocarbon radical or an —SiR²₃ radical, R¹, R², a, c, x and y are the same as above R³ is a divalent, optionally substituted organic radical, b is 0 or an integer between 1 and 100, and mixtures thereof with the proviso that each organosilicon compound molecule of formulas (IV), (V), (VI) and (VII) contain an average of more than two organyloxy radical RO—, where R is a monovalent, optionally substituted hydrocarbon radical, b of formula (VII) is on average greater than 0, and from 0 to 50% of the radicals R¹ in formula (VI) are hydrogen atoms.

4. The organo(poly)siloxane composition of claim 1, wherein component (C) is selected from the group consisting of

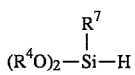

R⁴ is a monovalent, optionally substituted hydrocarbon radical or an —SiR²₃ radical, R² is a hydrogen atom or a monovalent organic radical, and R⁷ is a monovalent, SiC-bonded, optionally substituted hydrocarbon radical having 1 to 18 carbon atom(s),

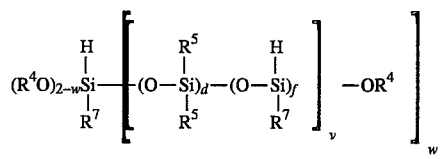

in which

R², and R⁷ are the same as above,

R⁴ is a monovalent, optionally substituted hydrocarbon radical, or an —SiR²₃ radical, R⁵ is a hydrogen atom, a monovalent organic radical or an organosiloxy group, d is 0 or an integer between 1 and 1,000, f is 0 or an integer between 1 and 100, v is an integer between 1 and 100, and w is 1 or 2, where d and f are on average greater than 0,

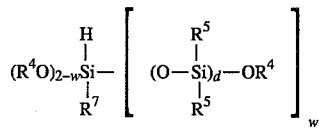

in which R², R⁵, R⁷, d and w are the same as above,

R⁴ is a monovalent, optionally substituted hydrocarbon radical, or an —SiR²₃ radical, and d is an integer between 1 and 1000,

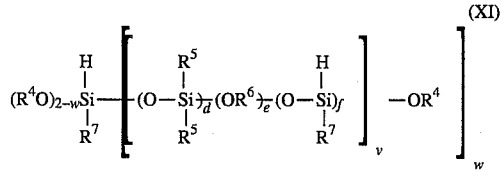

in which

R², R⁵, R⁷, v and w are the same as above,

R⁴ is a monovalent, optionally substituted hydrocarbon radical, or an —SiR²₃ radical, R⁶ is a divalent, optionally substituted organic radical, d is 0 or an integer between 1 and 1,000, e is 0 or an integer between 1 and 100, and f is 0 or an integer between 1 and 100, and mixtures thereof with the proviso that each organosilicon compound molecule for formulas (VIII), (IX), (X) and (XI) contains an average of more than one organyloxy radical R⁴O—, in which R⁴ is a monovalent, optionally substituted hydrocarbon radical; e in formula (XI) is on average greater than 0; and from 0 to 50% of the radicals R⁵ in formula (X) are hydrogen atoms.

5. The organopolysiloxane composition of claim 1, wherein the composition contains, based on the total weight of the organo(poly)siloxane composition, (A) from 20 to 98% by weight of α,ω-dihydroxyorgano(poly)siloxane, (B) from 1 to 50% by weight of an organosilicon compound of formula (I), (C) from 0 to 50% by weight of an organosilicon compound of formula (II), (D) from 0 to 70% by weight of filler, (E) from 0 to 70% by weight of plasticiser, (F) from 0 to 20% by weight of adhesion promoter, (G) from 0 to 20% by weight of scavenger, (H) from 0 to 10% by weight of condensation catalyst and (K) from 0 to 50% by weight of additives, with the proviso that at least one of components (D), (E) and (F) is present if component (B) is a silane of the formula $$(RO)_3\!-\!Si\!-\!H \qquad\qquad (IV)$$

where

R is a monovalent, optionally substituted hydrocarbon radical or an —$SiR^2_3$ radical and, $R^2$ is a hydrogen atom or a monovalent organic radical.

6. The organo(poly)siloxane composition of claim 5, wherein the condensation catalyst (H) is an acidic catalyst which is free from metal atoms.

7. A process for the preparation of organo(poly)siloxane compositions which can be cross-linked to form elastomers by the elimination of alcohols, which comprises mixing in a first step at a temperature of from 15° to 80° C. and at a pressure of from 900 to 1,100 hPa for from 5 to 90 minutes, the following ingredients;

(A) α,ω-dihydroxyorgano(poly)siloxane, (B) an organosilicon compound of the general formula

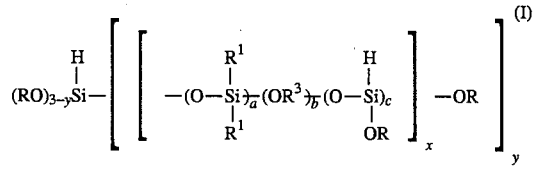

where

R is a monovalent, optionally substituted hydrocarbon radical or an —$SiR^2_3$ radical, $R^1$ is a hydrogen atom, a monovalent organic radical or an organosiloxy group, $R^2$ is a hydrogen atom or a monovalent organic radical, $R^3$ is a divalent, optionally substituted organic radical, a is 0 or an integer between 1 and 1,000, b is 0 or an integer between 1 and 100, c is 0 or an integer between 1 and 100, x is 0 or an integer between 1 and 100, and y is 1, 2 or 3, with the proviso that each organosilicon compound molecule of formula (I) contains an average of more than two organyloxy radicals RO—, where R is a monovalent, optionally substituted hydrocarbon radical, and optionally additives and subsequently, in a second step, continuing to stir the ingredients at a pressure of from 0.01 to 100 hPa for from 3 to 60 minutes, in which the stirring speed is selected so that the temperature of the composition during stirring increases to a value within the temperature range of from 15° C. to 80° C. without further heating.

8. The process of claim 7, wherein the ingredients (A) α,ω-dihydroxyorgano(poly)siloxane, (B an organosilicon compound of the general formula

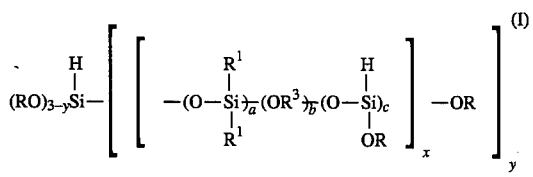

where

R is a monovalent, optionally substituted hydrocarbon radical or an —$SiR^2_3$ radical, $R^1$ is a hydrogen atom, a monovalent organic radical or an organosiloxy group, $R^2$ is a hydrogen atom or a monovalent organic radical, $R^3$ is a divalent, optionally substituted organic radical, a is 0 or an integer between 1 and 1,000, b is 0 or an integer between 1 and 100, c is 0 or an integer between 1 and 100, x is 0 or an integer between 1 and 100, and y is 1, 2 or 3, with the proviso that each organosilicon compound molecule of formula (I) contains an average of more than two organyloxy radicals RO—, where R is a monovalent, optionally substituted hydrocarbon radical, and optionally (C) an organosilicon compound of the general formula

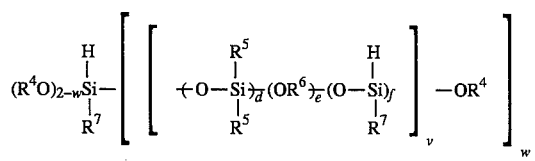

in which $R^2$ is the same as above, $R^4$ is a monovalent, optionally substituted hydrocarbon radical or an —$SiR^2_3$ radical, $R^5$ is a hydrogen atom, a monovalent organic radical or an organosiloxy group, $R^6$ is a divalent, optionally substituted organic radical, $R^7$ is a monovalent, SiC-bonded, optionally substituted hydrocarbon radical having 1 to 18 carbon atom(s), d is 0 or an integer between 1 and 1,000, e is 0 or an integer between 1 and 100, f is 0 or an integer between 1 and 100, v is 0 or an integer between 1 and 100, and w is 1 or 2, with the proviso that each organosilicon compound molecule of formula (II) contains an average of more than one organyloxy radical $R^4O$—, where $R^4$ is a monovalent, optionally substituted hydrocarbon radical and at least one additive selected from the group consisting of fillers, plasticisers and adhesion promoters, and optionally other additives are mixed in any sequence, in a first step, at a temperature of from 15° to 80° C. and at a pressure of from 900 to 1,100 hPa for from 5 to 90 minutes and subsequently, in a second step, continuing to stir the mixture at a pressure of from 0.01 to 100 hPa for from 3 to 60 minutes, in which the stirring speed is selected so that the temperature of the composition during stirring increases to a value within the temperature range of from 15° to 80° C. without further heating.

9. An organosilicon compound of the formula

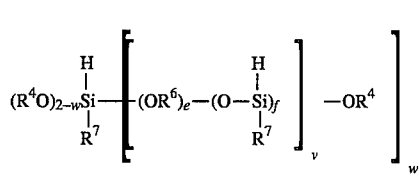
(XIa)

where

R⁴ is a monovalent, optionally substituted hydrocarbon radical or an —$SiR^2_3$ radical, $R^2$ is a hydrogen atom or a monovalent organic radical, $R^6$ is a divalent, optionally substituted organic radical, $R^7$ is a monovalent organic radical, e is 0 or an integer between 1 and 100, f is 0 or an integer between 1 and 100, v is an integer between 1 and 100, and w is 1 or 2, with the proviso that each organosilicon compound molecule contains an average of more than one organyloxy radical R⁴O—, where $R^4$ is a monovalent optionally substituted hydrocarbon radical, and e and f are each on average greater than 0.

10. An organosilicon compound of the formula

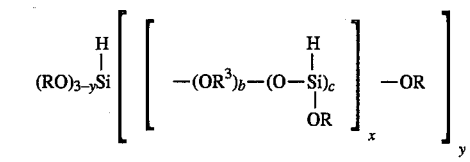
(VIIa)

in which $R^3$ is a divalent, optionally substituted organic radical, b is 0 or an integer between 1 and 100, c is 0 or an integer between 1 and 100, x is an integer between 1 and 100, y is 1, 2 or 3, R is a monovalent, optionally substituted hydrocarbon radical or an —$SiR^2_3$ radical, $R^2$ is a hydrogen atom or a monovalent organic radical, with the proviso that each organosilicon compound molecule contains an average of more than two organyloxy radicals RO—, where R is a monovalent, optionally substituted hydrocarbon radical, and b and c are each an average greater than 0.

* * * * *